(12) United States Patent
Ogura

(10) Patent No.: US 7,874,535 B2
(45) Date of Patent: Jan. 25, 2011

(54) CUP HOLDER

(75) Inventor: Mitsuo Ogura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 362 days.

(21) Appl. No.: 11/826,850

(22) Filed: Jul. 19, 2007

(65) Prior Publication Data

US 2008/0029672 A1    Feb. 7, 2008

(30) Foreign Application Priority Data

Aug. 2, 2006   (JP)   ............... 2006-211099

(51) Int. Cl.
A47K 1/08   (2006.01)

(52) U.S. Cl. ................. 248/311.2; 248/316.5; 224/926; 224/281

(58) Field of Classification Search ............. 248/311.2, 248/316.5; 224/926, 281
See application file for complete search history.

(56) References Cited

U.S. PATENT DOCUMENTS

| | | | | |
|---|---|---|---|---|
| 5,560,578 A * | 10/1996 | Schenken et al. | ........... | 248/313 |
| 5,601,269 A * | 2/1997 | Jankovic | .................. | 248/311.2 |
| 5,791,618 A * | 8/1998 | Lancaster | ................ | 248/311.2 |
| 6,070,844 A * | 6/2000 | Salenbauch et al. | ......... | 248/313 |
| 6,230,948 B1 * | 5/2001 | Steiger et al. | ............... | 224/539 |
| 6,691,967 B2 * | 2/2004 | Kaupp | ..................... | 248/311.2 |
| 6,702,243 B2 * | 3/2004 | Takeichi | ................... | 248/311.2 |
| 6,705,580 B1 * | 3/2004 | Bain | ........................ | 248/311.2 |
| 6,843,397 B2 * | 1/2005 | Then et al. | .................. | 224/552 |
| 7,290,678 B2 * | 11/2007 | Park | ........................... | 220/737 |
| 7,344,056 B2 * | 3/2008 | Shelmon et al. | ............. | 224/549 |
| 7,354,086 B2 * | 4/2008 | Park | ........................ | 296/24.34 |
| 7,481,343 B2 * | 1/2009 | Misumi | ...................... | 224/282 |
| 7,497,409 B2 * | 3/2009 | Lawlor | .................... | 248/311.2 |
| 2003/0155477 A1 * | 8/2003 | Schaal | ..................... | 248/311.2 |
| 2005/0001127 A1 * | 1/2005 | Schaal | ..................... | 248/311.2 |
| 2006/0243875 A1 * | 11/2006 | Chen | ....................... | 248/311.2 |

FOREIGN PATENT DOCUMENTS

| | | |
|---|---|---|
| JP | A-10-166928 | 6/1998 |
| JP | A-2005-112330 | 4/2005 |
| JP | A-2005-199989 | 7/2005 |

* cited by examiner

*Primary Examiner*—Terrell Mckinnon
*Assistant Examiner*—Michael McDuffie
(74) *Attorney, Agent, or Firm*—Posz Law Group, PLC

(57) ABSTRACT

A cup holder includes a box-shaped body having a holder opening at the top, a supporting arm, an urging element urging the supporting arm to come inward into the holder opening of the box-shaped body, an engaging element engages temporarily the supporting arm at a retreated position, an enabling/disabling element enabling the urging action of the urging element and disabling the engagement action of the engaging element by a pressing force resulting from a container, a fixing element, and a releasing element. The fixing element includes a mechanical mechanism, which fixes the supporting arm to bring it into contact with the container. The releasing element includes a mechanical mechanism, which releases the supporting arm from the fixing action of the fixing element upon taking out the container, and enables the supporting arm to come outward out of the holder opening.

10 Claims, 14 Drawing Sheets

CUP HOLDER

BACKGROUND OF THE INVENTION

1. Field of the Invention

The present invention relates to a cup holder, which is disposed in automotive passenger rooms. More specifically, it relates to a cup holder, which enables a user to stably hold containers, which have various diameters, by snap action or through one-touch operation.

2. Description of the Related Art

A cup holder, which is disposed in an automobile passenger room, comprises a movable supporting member, which is capable of supporting containers with various diameters. For example, Japanese Unexamined Patent Publication (KOKAI) No. 2005-112330 discloses a cup holder, which comprises a supporting bench being disposed horizontally and rotatably. According to the gazette, the supporting bench can support beverage containers, which have various sizes. Moreover, the gazette also discloses that the cup holder is further provided with locking means for fixing the supporting bench at a specific rotary position on the rotary shaft.

In the conventional cup holder, both supporting bench and locking means should be operated manually. Accordingly, in order to stably hold a container, two rounds of operations are required; that is, an operation for rotating the supporting bench inward into the holder opening; and an operation for actuating the locking means. Moreover, even when putting the supporting bench in the out-of-service state, two rounds of operations are required as well; that is, an operation for releasing the locking means; and an operation for rotating the supporting bench outward out of the holder opening.

Moreover, Japanese Unexamined Patent Publication (KOKAI) No. 2005-199989 discloses a cup holder, which comprises: a plurality of supporting arms working as a supporting member; urging springs for urging the supporting arms in such a direction that the supporting arms retreat outward out of the holder openings; ring-shaped members for moving the supporting arms in such a direction that the supporting arms advance inward into the holder openings; and operation knobs for actuating the ring-shaped members.

According to the second conventional cup holder, it is possible to automatically move the supporting arms in such a direction that the supporting members advance inward into the holder openings by operating the operation knobs, and thereby it is possible to stably hold a container in the conventional cup holder. However, when holding another container, a series of the following troublesome manipulations have become necessary: namely, moving the supporting arms in such a direction that the supporting arms retreat outward out of the holder openings by operating the operation knobs; removing the container, which is held in one of the holder openings; putting another container into one of the holder openings; and then moving the supporting arms in such a direction that the supporting arms advance inward into the holder openings by operating the operation knobs again.

As can be understood from the gazettes, the conventional cup holders have been associated with the problem that the operation for holding a container therein or the operation for holding another containers with different diameters has caused troubles. Hence, as disclosed in Japanese Unexamined Patent Publication (KOKAI) No. 10-166928, it has been devised to carry out the operations in an electrically-powered manner using an electric motor. However, the resulting cup holder has turned into a very costly one.

SUMMARY OF THE INVENTION

The present invention has been developed in view of the aforementioned circumstances. It is therefore an object of the present invention to provide a cup holder, which makes the following actions possible by snap action or through one-touch operation by means of mechanical mechanism, not only moving a supporting arm to a supporting position, which is located along the outer periphery of a container, but also fixing the supporting arm at the supporting position, thereby holding the container stably; and additionally manually retreating the supporting arm outward out of the holder opening when the container is removed from the holding position.

A cup holder according to the present invention can solve the aforementioned problems, and comprises:

a box-shaped body having a holder opening at a top thereof;

a supporting arm retained to the box-shaped body, and disposed movably so as to come in and come out of the holder opening of the box-shaped body;

an urging element for urging the supporting arm in such a direction that the supporting arm advances to come inward into the holder opening of the box-shaped body;

an engaging element for temporarily engaging the supporting arm at a retreated position where the supporting arm retreats to come outward out of the holder opening of the box-shaped body;

an enabling/disabling element for enabling the urging action of the urging element, and for disabling the engagement action of the engaging element by a pressing force resulting from a container, which is fitted into the box-shaped body through the holder opening;

a fixing element comprising a mechanical mechanism for fixing the supporting arm in such a state that the supporting arm is brought into contact with an outer peripheral surface of the container; and a releasing element comprising a mechanical mechanism for releasing the supporting arm from the fixing action of the fixing element upon taking out the container through the holder opening of the box-shaped body, and for enabling the supporting arm to move in such a direction that the supporting arm retreats to come outward out of the holder opening.

In the present cup holder, the releasing element can preferably comprise: a movable bottom disposed in the holder opening of the box-shaped body, and being urged upward; and a link mechanism for releasing the supporting arm from the fixing action of the fixing element as the movable bottom moves upward, for inhibiting the supporting arm from moving in such a direction that the supporting arm advances to come inward into the holder opening of the box-shaped body, and for enabling the supporting arm to move in such a direction that the supporting arm retreats to come outward out of the holder opening.

The present cup holder can preferably further comprise a lid for opening and closing the holder opening of the box-shaped body, wherein: the urging member can preferably accumulate an urging force when the lid moves in such a direction that the lid closes the holder opening of the box-shaped body.

Moreover, the above-described preferable present cup holder can preferably furthermore comprise a compulsory releasing element for releasing the supporting arm from the fixing action of the fixing element when the lid moves in such a direction that the lid closes the holder opening of the box-shaped body, and for moving the supporting arm compulsorily in such a direction that the supporting arm retreats to come outward out of the holder opening.

When a user fits a container into the present cup holder through the holder opening of the box-shaped body, the container exerts a pressing force to the enabling/disabling element to actuate it. Accordingly, the enabling/disabling element releases the supporting arm from the engaging action of the engaging element. Consequently, the urging element exerts an urging force to the supporting arm. Thus, the supporting arm moves in such a direction that it advances inward into the holder opening of the box-shaped body.

When the supporting arm stops in such a state that it is brought into contact with an outer peripheral surface of the container, the fixing element fixes the supporting arm at such a position. Therefore, even when a user takes up the container to drink a beverage therein, the supporting arm is kept being placed at the position. Then, when a user puts the container again back into the holder opening of the box-shaped body, too, the supporting arm supports the container stably.

However, when the container is taken out of the holder opening of the box-shaped body, the supporting arm is exposed within the holder opening. Under such circumstances, if the fixing element is functioning, it is difficult for the supporting arm to move (or retreat) outward out of the holder opening. Moreover, when a user fits the container or another container into the holder opening, the supporting arm has interfered with the bottom of the container.

Hence, the present cup holder comprises the releasing element, which comprises a mechanical mechanism. The releasing element releases the supporting arm from the fixing action of the fixing element upon taking out the container through the holder opening of the box-shaped body, and enables the supporting arm to move in such a direction that the supporting arm retreats to come outward out of the holder opening. Therefore, when a user presses the supporting arm with the container's bottom or the tip of his or her finger, it is possible to retreat the supporting arm to come outward out of the holder opening. Moreover, it is possible to preemptively inhibit the supporting arm from being broken. In this instance, note that the supporting arm hardly advances inward into the holder opening because the engaging element operates to temporarily engage the supporting arm at a retreated position.

Specifically, the present cup holder enables a user to automatically move the supporting arm to a position for supporting a container by such an operation only that he or she fits the container into the holder opening of the box-shaped body. Moreover, even when a user removes the container from out of the present cup holder, the supporting arm is kept being placed at the supporting position. In addition, after a user has removed the container from out of the holder opening, he or she can move the supporting arm manually to fully open the holder opening. Therefore, the present cup holder is extremely good in terms of the operability. Moreover, the present cup holder can be manufactured less expensively, because it can be made of mechanical mechanisms alone without employing electromotive force.

When finishing using the present cup holder, a user takes the container from out of the holder opening of the box-shaped body. In this instance, the supporting arm may be exposed within the holder opening as described above. However, it is preferable to make the supporting arm retreat automatically outward out of the holder opening.

Hence, the present cup holder according to one of the preferable embodying modes can preferably further comprise: a lid for opening and closing the holder opening of the box-shaped body; and additionally can preferably furthermore comprise: a compulsory releasing element for releasing the supporting arm from the fixing action of the fixing element when the lid moves in such a direction that the lid closes the holder opening of the box-shaped body, and for moving the supporting arm compulsorily in such a direction that the supporting arm retreats to come outward out of the holder opening; wherein the supporting arm is released from the fixing action of the fixing element when the lid moves in such a direction that the lid closes the holder opening of the box-shaped body. If such is the case, when a user moves the lid to close the holder opening, the closing lid actuates the compulsory releasing element to release the supporting arm from the fixing action of the fixing element, and then the urging element accumulates an urging force therein so that the supporting arm moves in such a direction that it retreats outward out of the holder opening. As a result, the holder opening is fully opened so that the present cup holder is ready for a user's next round of operation for fitting the same or another container into the present cup holder.

Specifically, the present cup holder according to one of the preferable embodying modes enables a user to automatically move the supporting arm to a position for supporting a container by such an operation only that he or she fits the container into the holder opening of the box-shaped body. Moreover, even when a user removes the container from out of the present cup holder, the supporting arm is kept being placed at the supporting position. In addition, a user can retreat the supporting arm to such a position that it fully opens the holder opening by his or her operation to close the lid. Therefore, the present cup holder is extremely good in terms of the operability. Moreover, the present cup holder can be manufactured less expensively, because it can be made of mechanical mechanisms alone without employing electromotive force.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
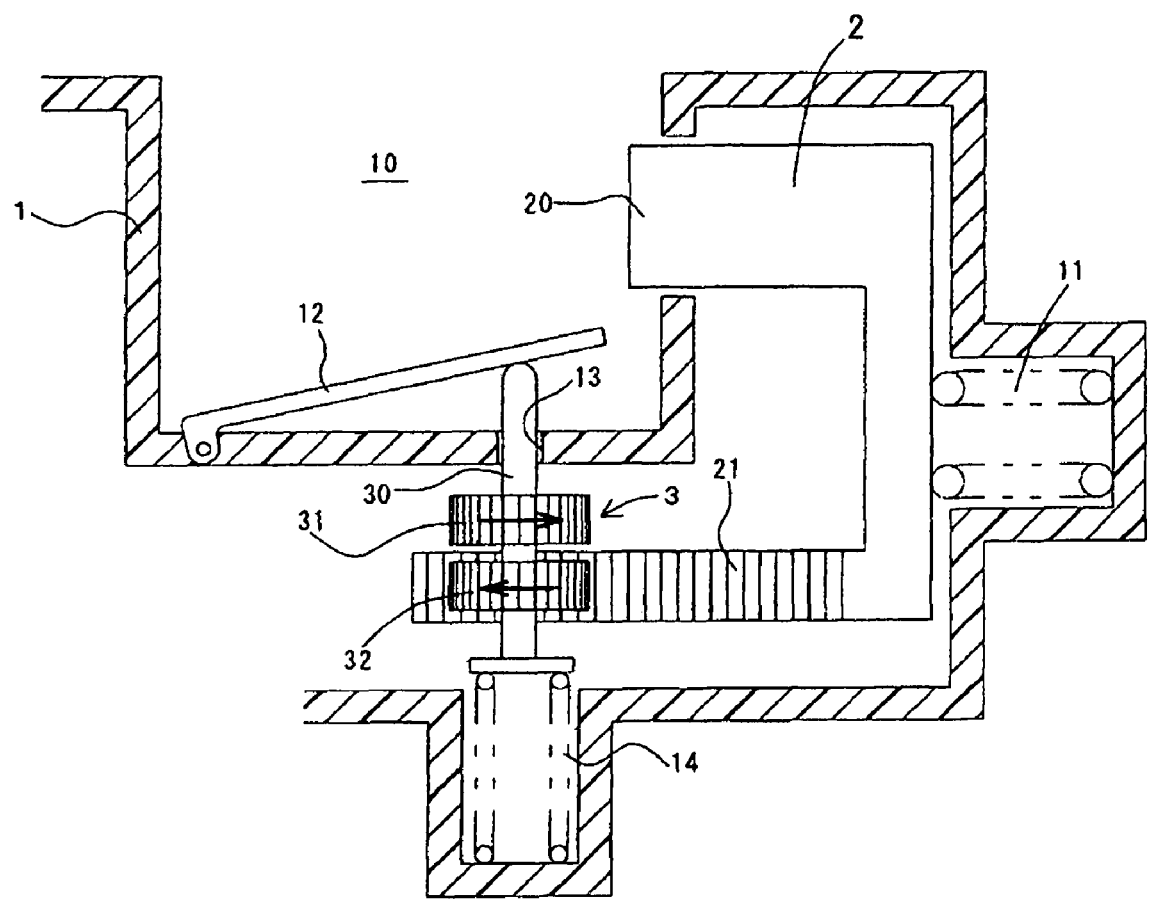
FIG. 1 is a cross-sectional diagram for illustrating a major portion of a cup holder according to Example No. 1 of the present invention.

Having generally described the present invention, a further understanding can be obtained by reference to the specific preferred embodiments which are provided herein for the purpose of illustration only and not intended to limit the scope of the appended claims.

A cup holder according to the present invention comprises a box-shaped body, and a supporting arm. The box-shaped body has a holder opening at a top thereof. The supporting arm is retained to the box-shaped body, and is disposed movably so as to come in and come out of the holder opening of the box-shaped body.

The present cup holder further comprises an urging element. The urging element urges the supporting arm in such a direction that the supporting arm advances to come inward into the holder opening of the box-shaped body. It is possible to use a spring alone or a combination of various link mechanisms and springs for the urging element. When the present cup holder furthermore comprises a lid which swings to open and close the holder opening of the box-shaped body, the urging element can comprise a first gear, which is disposed integrally with the lid, a second gear, which meshes with the first gear, and a spring, which is disposed to the second gear. Moreover, when the lid is disposed slidably to open and close the holder opening of the box-shaped body, the urging element can also comprise a pinion or rack, which is disposed to the lid, a rack or pinion, which is disposed to the box-shaped body, and a spring, which accumulates an urging force as the pinion rotates.

The present cup holder further comprises an engaging element. The engaging element temporarily engages the supporting arm at a retreated position where the supporting arm retreats to come outward out of the holder opening of the box-shaped body. It is possible to use various ratchet mechanisms for the engaging element. Until a user actuates a later-described enabling/disabling element, the engaging element keeps the urging element accumulating the urging force for urging the supporting arm in such a direction that the supporting arm advances to come inward into the holder opening of the box-shaped body.

The present cup holder further comprises an enabling/disabling element. The enabling/disabling element enables the urging action of the urging element, and disables the engagement action of the engaging element by a pressing force resulting from a container, which is fitted into the box-shaped body through the holder opening. The enabling/enabling element can preferably disable the engagement action of the engaging element by a pressing force resulting from a container, which is fitted into the box-shaped body through the holder opening. More preferably, the enabling/disabling element can disable the engagement action of the engaging element by the weight of a container, which is fitted into the box-shaped body through the holder opening. For example, the enabling/disabling element can preferably comprise a movable bottom, which is disposed in the holder opening of the box-shaped body, and a link mechanism for releasing the supporting arm from the engagement action of the engaging element by the downward movement of the movable bottom.

When the enabling/disabling element disables the engagement action of the engaging element, the urging force accumulated in the urging member moves the supporting arm in such a direction that the supporting arm advances inward into the holder opening of the box-shaped body to contact with an outer peripheral surface of the container. Thus, the present cup holder can hold the container stably. However, if nothing is done, that is, if the present cup holder does not furthermore comprise an additional constituent element, when a user takes the container out of the box-shaped body through the holder opening, the supporting arm has further moved in such a direction that the supporting arm has further advanced inward into the holder opening of the box-shaped body. As a result, it has become difficult for a user to fit the container or another container into the holder opening again.

Hence, the present cup holder further comprises a fixing element. The fixing element comprises a mechanical mechanism for fixing the supporting arm in such a state that the supporting arm is brought into contact with an outer peripheral surface of the container. It is advisable to make the fixing element fix the supporting arm itself, or to make the fixing element fix a gear, which engages or meshes with the supporting arm. It is preferable that the fixing element can double as the above-described engaging element.

However, if nothing is done, that is, if the present cup holder does not furthermore comprise another additional constituent element, although the present cup holder can keep the supporting arm being advanced inward into the holder opening of the box-shaped body, it is impossible for the present cup holder to hold containers with much smaller diameters when a user tries to retain them within the present cup holder. Moreover, it has become difficult for a user to even fit containers with much larger diameters into the holder opening of the box-shaped body.

Hence, the present cup holder furthermore comprises a releasing element. The releasing element comprises a mechanical mechanism for releasing the supporting arm from the fixing action of the fixing element upon taking out the container through the holder opening of the box-shaped body, and enables the supporting arm to move in such a direction that the supporting arm retreats to come outward out of the holder opening. Thus, the releasing element enables a user to move the supporting arm in such a direction that the supporting arm retreats to come outward out of the holder opening.

The releasing element can preferably comprise a movable bottom, and a link mechanism, for instance. The movable bottom can preferably be disposed in the holder opening of the box-shaped body, and can preferably be urged upward. The link mechanism can preferably release the supporting arm from the fixing action of the fixing element as the movable bottom moves upward, can preferably inhibit the supporting arm from moving in such a direction that the supporting arm advances to come inward into the holder opening of the box-shaped body, and can preferably enable the supporting arm to move in such a direction that the supporting arm retreats to come outward out of the holder opening. As for the link mechanism, it is possible to utilize ratchet mechanisms, and one-way or two-way clutch gears as disclosed in later-described examples.

Moreover, the present cup holder can preferably further comprise a lid, and a compulsory releasing element. The lid can preferably open and close the holder opening of the box-shaped body. The compulsory releasing element can preferably release the supporting arm from the fixing action of the fixing element when the lid moves in such a direction that the lid closes the holder opening of the box-shaped body, and can preferably move the supporting arm compulsorily in such a direction that the supporting arm retreats to come outward out of the holder opening. If such is the case, when a user closes the lid once, the supporting arm moves in such a direction that it retreats to come outward out of the holder opening of the box-shaped body. Accordingly, the holder opening is reset to fully open. Consequently, the preferable present cup holder is reset for the user's next round of operation for fitting the container or another container into the holder opening. Thus, when a user opens the lid, the user can stably hold containers having the other outside diameters with the preferable present cup holder, because the urging element re-accumulates an urging force in this instance.

Note that, in the present cup holder, the urging element exerts an urging force to the supporting arm in such a direction that the supporting arm comes inward into the holder opening of the box-shaped body. Therefore, in a certain case, the supporting arm might run into an outer peripheral surface of the container with momentum to produce undesirable noises. In order to inhibit such a drawback, it is preferable to use a damper for the present cup holder. However, when the fixing element fixes the supporting arm, vibrations might make the supporting arm collide with the container to produce undesirable noises. Moreover, when a user fits the container, which he or she has taken out of the present cup holder once, into the holder opening of the box-shaped body again, the container and the supporting arm might interfere with each other so that it might be difficult for the user to fit the container into the holder opening again.

Hence, it is preferable to dispose an elastic member, such as sponges, on a surface of the supporting arm, surface which faces an outer peripheral surface of the container. With such an arrangement, the urging element exerts an urging force to the supporting arm to bring the supporting arm into contact with the container, and thereby the elastic member is deformed by compression to produce an elastic reaction force. As a result, the elastic member improves the holding ability of the present cup holder, and additionally can inhibit the supporting arm from producing undesirable noises. Moreover, when a user fits the container, which he or she has taken out of the present cup holder once, into the holder opening of the box-shaped body again, the elastic member deforms elastically to make it easy for the user to fit the container into the holder opening.

EXAMPLES

Hereinafter, the present cup holder will be described in more detail with reference to specific examples.

Example No. 1

Figure 2:
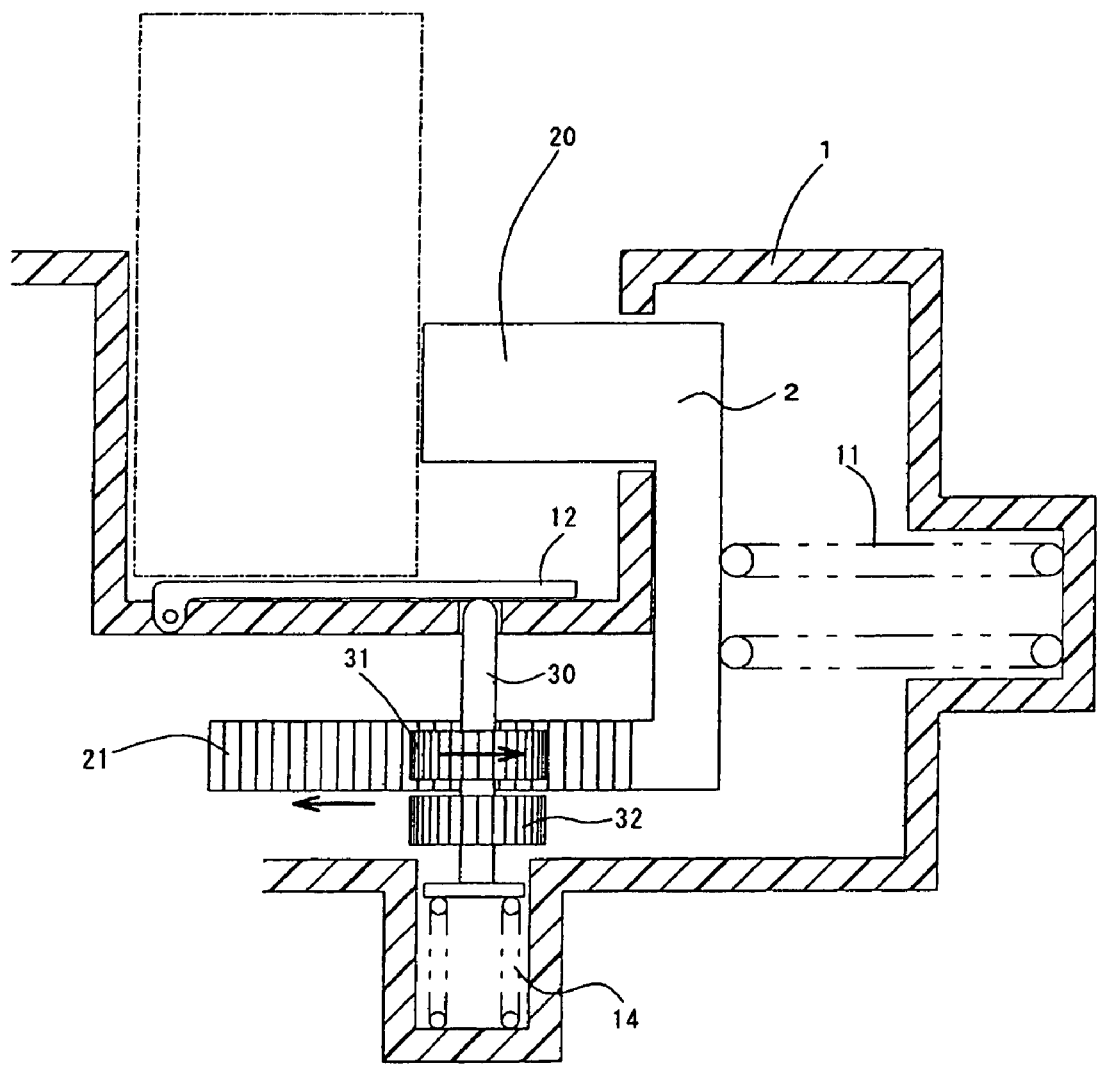
FIG. 2 is another cross-sectional diagram for illustrating the major portion of the cup holder according to Example No. 1.
Figure 3:
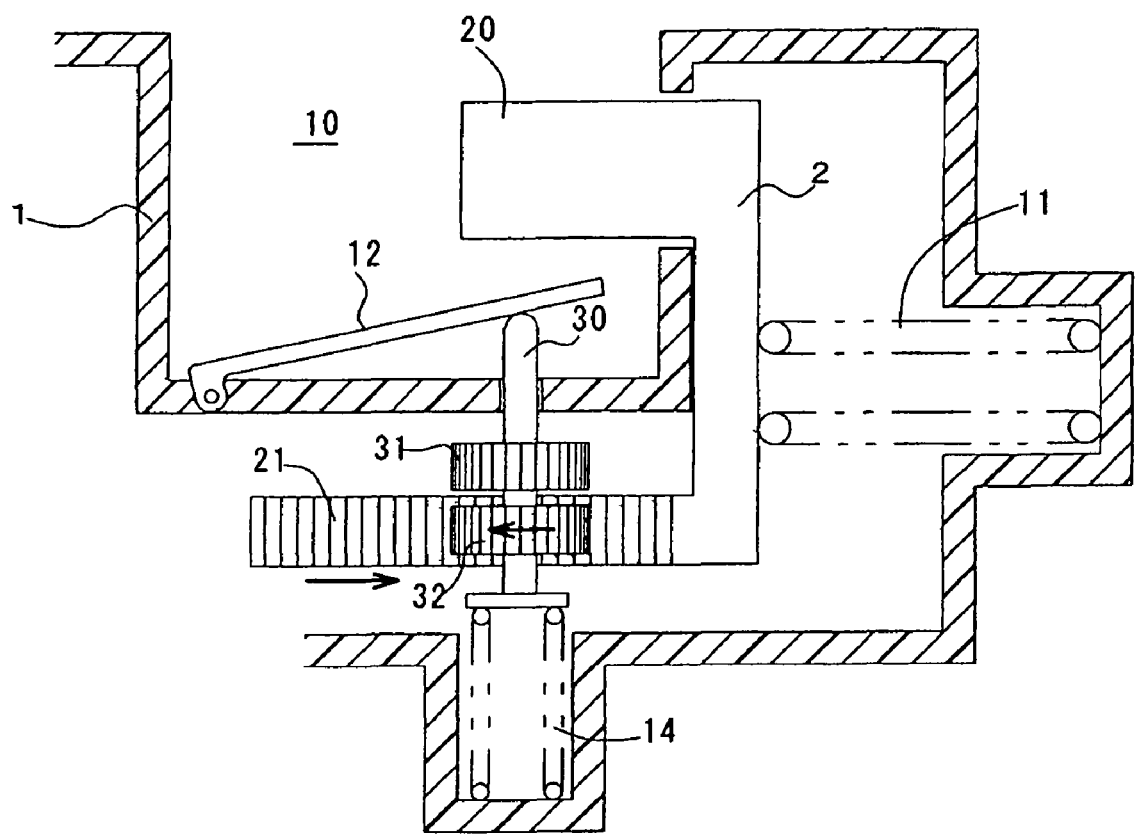
FIG. 3 is still another cross-sectional diagram for illustrating the major portion of the cup holder according to Example No. 1.
Figure 4:
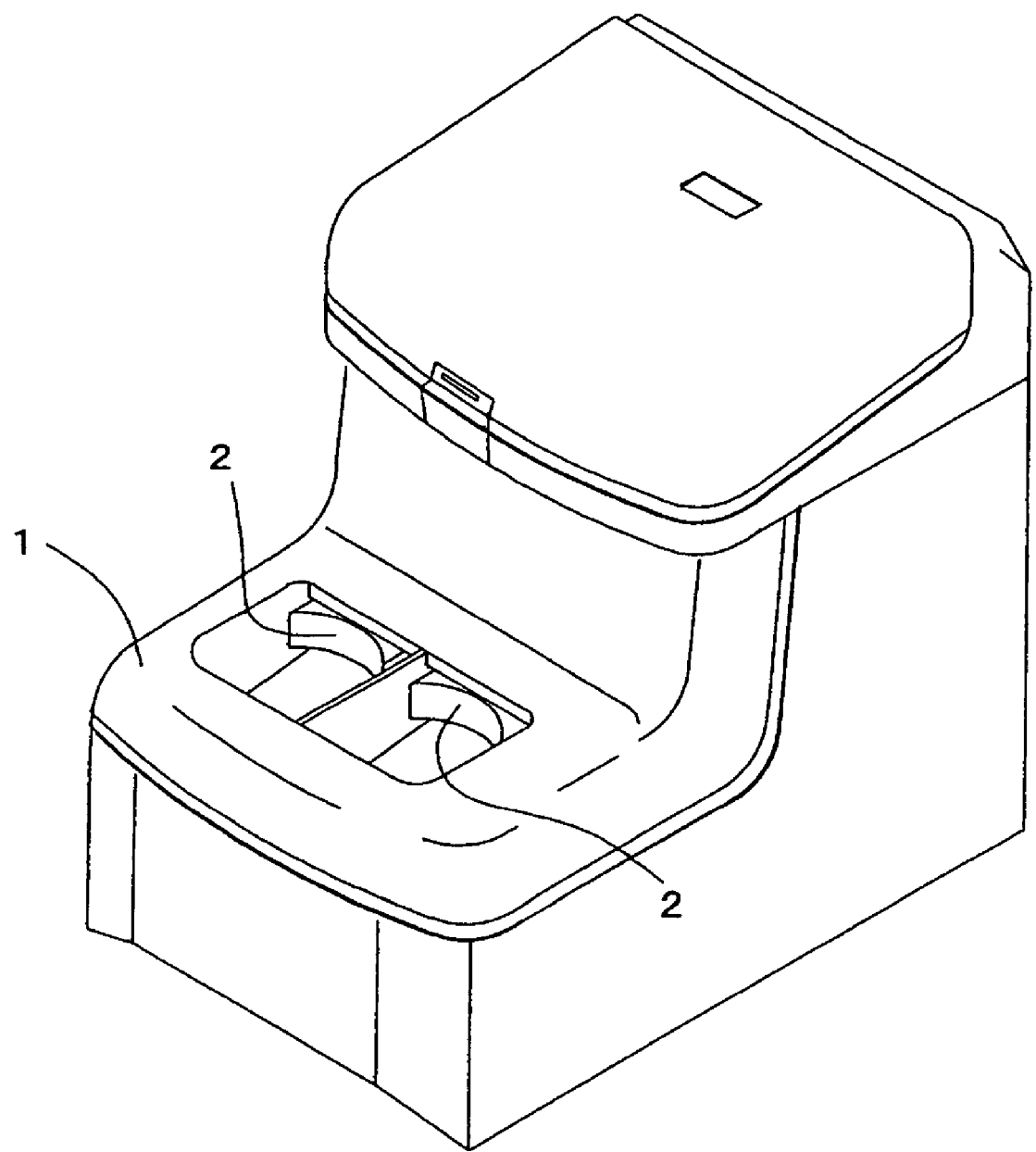
FIG. 4 is a perspective diagram for illustrating a console box, which is equipped with the cup holder according to Example No. 1.

FIGS. 1 through 3 illustrate a cup holder according Example No. 1 of the present invention in cross section. The cup holder is disposed in an automotive console box, which is shown in FIG. 4, to use.

As illustrated in the drawings, the cup holder according to Example No. 1 of the present invention comprises a box-shaped body 1, and a supporting arm 2. The box-shaped body 1 has a holder opening 10 at the top. The supporting arm 2 is retained to the box-shaped body 1, and is disposed movably so as to come in and come out of the holder opening 10 of the box-shaped body 1, that is, movably in the front/rear direction of a vehicle. The cup holder according to Example No. 1 further comprises a spring 11. The spring 11 is disposed between the box-shaped body 1 and the supporting arm 2, and urges the supporting arm 2 in such a direction that the supporting arm 2 advances to come inward into the holder opening 10. The supporting arm 2 comprises an arm 20 and a rack 21, and is formed as a substantially letter-U shape in cross section. The arm 20 comes in and comes out of the holder opening 10. The rack 21 extends parallelly to the arm 20.

The cup holder according to Example No. 1 of the present invention further comprises a movable bottom plate 12. The movable bottom plate 12 is disposed in the holder opening 10 of the box-shaped body 1, and is retained swingably to the bottom of the holder opening in the up/down direction about one of the opposite ends.

The cup holder according to Example No. 1 of the present invention further comprises a gear assembly 3, which is disposed under the holder opening 10 of the box-shaped body 1. The gear assembly 3 is disposed movably in the up/down direction, and comprises an upper pinion gear 31, a lower pinion gear 32, and a vertical shaft 30. The upper pinion gear 31 and lower pinion gear 32 are fastened to the vertical shaft 30. The bottom of the holder opening 10 is provided with a through hole 13. The upper opposite end of the gear assembly 3's vertical shaft 30 is fitted into the through hole 13 to protrude into the holder opening 10. Moreover, a spring 14 is disposed between the box-shaped body 1 and the lower opposite end of the vertical shaft 30. The spring 14 urges the gear assembly 3 upward, that is, in such a direction that the vertical shaft 30's upper opposite end advances to come inward into the holder opening 10.

The gear assembly 3's upper pinion gear 31 and lower pinion 32 are formed so as to mesh with the supporting arm 2's rack 21. Moreover, the upper pinion gear 31 is configured to make a one-way clutch mechanism, which can rotate only in the rightward arrowheaded direction of FIG. 1. In addition, the lower pinion gear 32 is configured to make a one-way clutch mechanism, which can rotate only in the opposite direction to the upper pinion gear 31's rotating direction, i.e., only in the leftward arrowheaded direction of FIG. 1.

The running mechanism of the cup holder according to Example No. 1 of the present invention, that is, how the cup holder according to Example No. 1 operates will be hereinafter described. Note that the direction in which the supporting arm 2's arm 20 advances to come inward into the holder opening 10 of the box-shaped body 1 will be hereinafter referred to as a "forward direction." On the other hand, the direction in which the arm 20 retreats to come outward out of the holder opening 10 will be hereinafter referred to as a "reverse direction."

When the cup holder according to Example No. 1 of the present invention is put in the conditions shown in FIG. 1 in which no container is fitted into the cup holder according to Example No. 1 through the holder opening 10 of the box-shaped body 1, the spring 14 urges the gear assembly 3 upward, and then the gear assembly 3's lower pinion gear 32 meshes with the supporting arm 2's rack 21. Thus, since the upper opposite end of the gear assembly 3's vertical shaft 30 protrudes into the holder opening 10, the vertical shaft 30 presses the box-shaped body 1's movable bottom plate 12. Accordingly, the movable bottom plate 12 is put in such a state that one of the opposite ends is lifted upward. Under the circumstances, the supporting arm 2 is moved rightward as shown in FIG. 1, and the spring 11 accumulates an urging force for urging the supporting arm leftward in the drawing. Moreover, the lower pinion gear 32, which can rotate to move the supporting arm 2's rack 21 only in the reverse direction, meshes with the rack 21. Consequently, the supporting arm 2 is stopped to keep the conditions shown in FIG. 1.

When a user fits a container into the cup holder according to Example No. 1 of the present invention through the holder opening 10 of the box-shaped body 1, the weight of the container swings the lifted opposite end of the movable bottom plate 12 downward, and then presses the gear assembly 3's vertical shaft 30 downward against the urging force of the spring 14. Thus, the gear assembly 3's upper pinion gear 31 meshes with the supporting arm 2's rack 21 to enable the rack 21 to move in the forward direction. Then, the urging force of the spring 11 moves the supporting arm 2 in the forward direction. When the container is held between an inner wall surface of the holder opening 10 and an end surface of the supporting arm 2's arm 20, the supporting arm 2 stops moving leftward in the FIGS. 1 through 3. FIG. 2 illustrates the above-described circumstances.

Under the conditions shown in FIG. 2, the cup holder according to Example No. 1 of the present invention can stably hold the container without ever suffering from such a drawback that the container falls down, because the container is held between an inner wall surface of the holder opening 10 and an end surface of the supporting arm 2's arm 20. When the user takes the container out of the cup holder according to Example No. 1 through the holder opening 10 of the box-shaped body 1, the spring 14 urges the gear assembly 3 to move upward, and then the gear assembly 3's lower pinion gear 32 meshes with the supporting arm 2's rack 21. Accordingly, as illustrated in FIG. 3, the supporting arm 2 is inhibited from moving in such a direction that it advances to come inward into the holder opening 10. Consequently, the supporting arm 2 is stopped to keep the circumstances shown in FIG. 3. Moreover, the spring 14 urges the gear assembly 3's vertical shaft 30 upward to swing the movable plate 12 upward. Therefore, it is possible for the user to fit the container or another container into the cup holder according to Example No. 1 through the holder opening 10 again.

Note that, under the conditions shown in FIG. 3, the supporting arm 2 can move in the reverse direction because the gear assembly 3's lower pinion gear 32 meshes with the supporting arm 2's rack 21. Therefore, when a user presses the supporting arm 2's arm 20 with his or her fingertip against the urging force of the spring 11, the supporting arm 2 moves readily in the reverse direction. As a result, the supporting arm 2's arm 20 retreats to come outward out of the holder opening 10 of the box-shaped body 1. Thus, the cup holder according to Example No. 1 of the present invention is put back in the circumstances shown in FIG. 1.

Specifically, in the cup holder according to Example No. 1 of the present invention, the spring 11 makes the claimed urging element for urging the supporting arm 2 in such a direction that the supporting arm 2 advances to come inward into the box-shaped body 1's holder opening 10. Further, the gear assembly 3's lower pinion gear 32 and the supporting arm 2's rack 21 make the claimed engaging element for temporarily engaging the supporting arm 2 at a retreated position where the supporting arm 2 retreats to come outward out of the holder opening 10. Furthermore, the box-shaped body 1's movable bottom plate 12 makes the claimed enabling/disabling element for releasing the supporting arm 2 from the engagement action of the gear assembly 3's lower pinion gear 32 and supporting arm 2's rack 21, the claimed engaging element, by a pressing force resulting from a container, which is fitted into the box-shaped body 1 through the holder opening 10, and enabling the urging action of the spring 11, the claimed urging element. Moreover, the gear assembly 3's upper pinion gear 31 and the supporting arm 2's rack 21 make the claimed fixing element for fixing the supporting arm 2 in such a state that the supporting arm 2 is brought into contact with an outer peripheral surface of the container. In addition, the spring 14, the gear assembly 3 and the supporting arm 2's rack 21 make the claimed releasing element for releasing the supporting arm 2 from the fixing action of the gear assembly 3's upper pinion gear 31 and supporting arm 2's rack 21, the claimed fixing element, when taking the container through the holder opening 10 of the box-shaped body 1, and enabling the supporting arm 2 to move in such a direction that the supporting arm 2 retreats to come outward out the holder opening 10. Note herein that the supporting arm 2's rack 21 and the gear assembly 3's upper pinion gear 31 and lower pinion gear 32 not only function as the claimed fixing element but also functions as the claimed engaging element.

Example No. 2

Since the cup holder according to Example No. 1 of the present invention comprises the upper pinion gear 31 and the lower pinion gear 32, both of which are configured to make a one-way clutch mechanism, it might be manufactured at comparatively high costs. Hence, a cup holder according to Example No. 2 of the present invention comprises the above-described lower pinion gear 32 and a simple gear 33, for instance, as illustrate in FIG. 5. Moreover, the lower pinion gear 32 and the gear 33 are designed to always mesh with each other.

Figure 5:
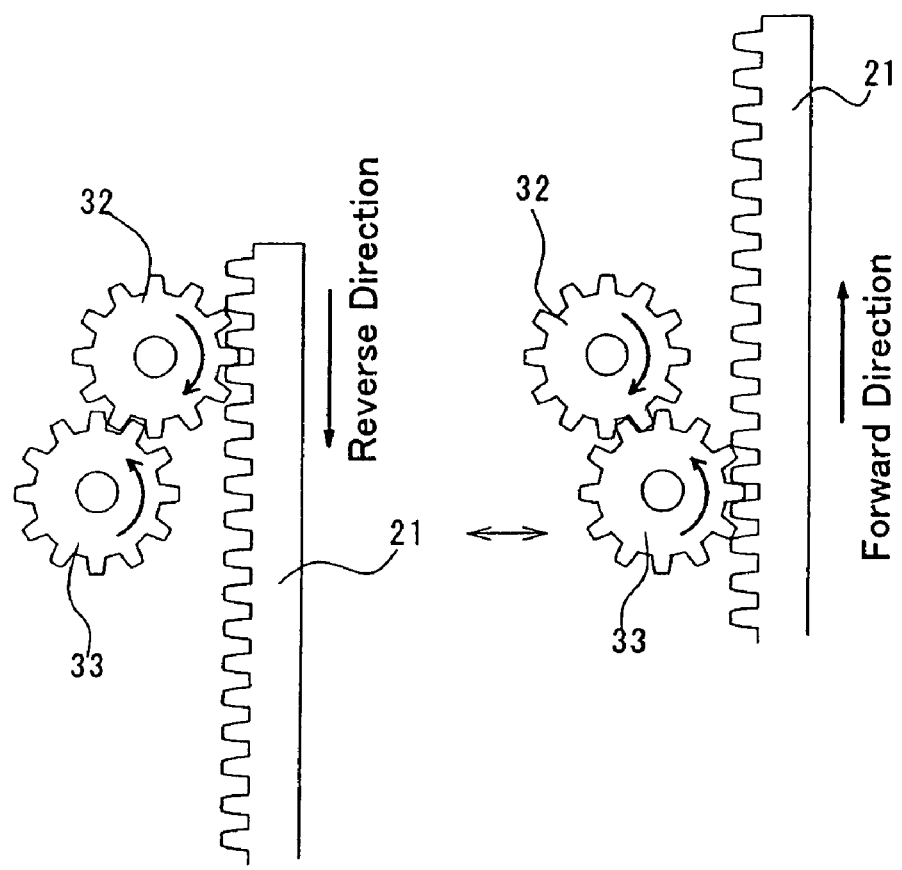
FIG. 5 is an explanatory diagram for illustrating how a cup holder according to Example No. 2 of the present invention operates.

In the conditions that are equivalent to FIG. 1, no container is fitted into the cup holder according to Example No. 2 of the present invention through the box-shaped body 1's holder opening 10, only the gear assembly 3's lower pinion gear 32 meshes with the supporting arm 2's rack 21 as shown in the left-hand side of FIG. 5. Therefore, in the same manner as the supporting arm 2 of the cup holder according to Example No. 1, the supporting arm 2 is put in a state that it is moved most rightward, as shown in FIG. 1. Accordingly, the spring 11 accumulates an urging force therein. Moreover, the lower pinion gear 32, which can rotate in such a direction that the rack 21 moves in the reverse direction alone, meshes with the rack 21. Consequently, the supporting arm 2 is stopped to keep the circumstances shown in FIG. 1.

When a user fits a container into the cup holder according to Example No. 2 of the present invention through the box-shaped body 1's holder opening 10, the weight of the container swings one of the opposite ends of the movable plate 12 downward, and then a not-shown link mechanism disengages the gear assembly 3's lower pinion gear 32 from the supporting arm 2's rack 21, and additionally meshes the gear assembly 3's gear 33 with the supporting arm 2's rack 21. Thus, the not-shown link mechanism enables the supporting arm 2's rack 21 to move in the forward direction. Accordingly, the urging force accumulated in the spring 11 moves the supporting arm 2 in the forward direction. When the container is held between an inner wall surface of the holder opening 10 and an end surface of the supporting arm 2's arm 20, the supporting arm 2 stops moving leftward in the drawings. Moreover, in the conditions that are equivalent to FIG. 3 and the user removes the container out of the cup holder according to Example No. 2, a not-shown spring swings the one of the opposite ends of the movable bottom plate 12 upward, and then the gear assembly 3's lower pinion 32 meshes with the supporting arm 2's rack 21. Accordingly, the meshing makes the supporting arm 2 movable in the reverse direction. Consequently, when a user presses the supporting arm 2's arm 20 with his or her fingertip against the urging force of the spring 11, the supporting arm 2 moves readily in the reverse direction. As a result, the supporting arm 2's arm 20 retreats to come outward out of the box-shaped body 1's holder opening 10. Thus, the cup holder according to Example No. 2 is put back in the circumstances shown in FIG. 1.

Therefore, the cup holder according to Example No. 2 of the present invention can be manufactured less expensively than the cup holder according to Example No. 1 is manufactured, because it comprises the less complicated one-way clutch mechanism, which is made of one and only pinion gear and a simple gear.

Example No. 3

Figure 6:
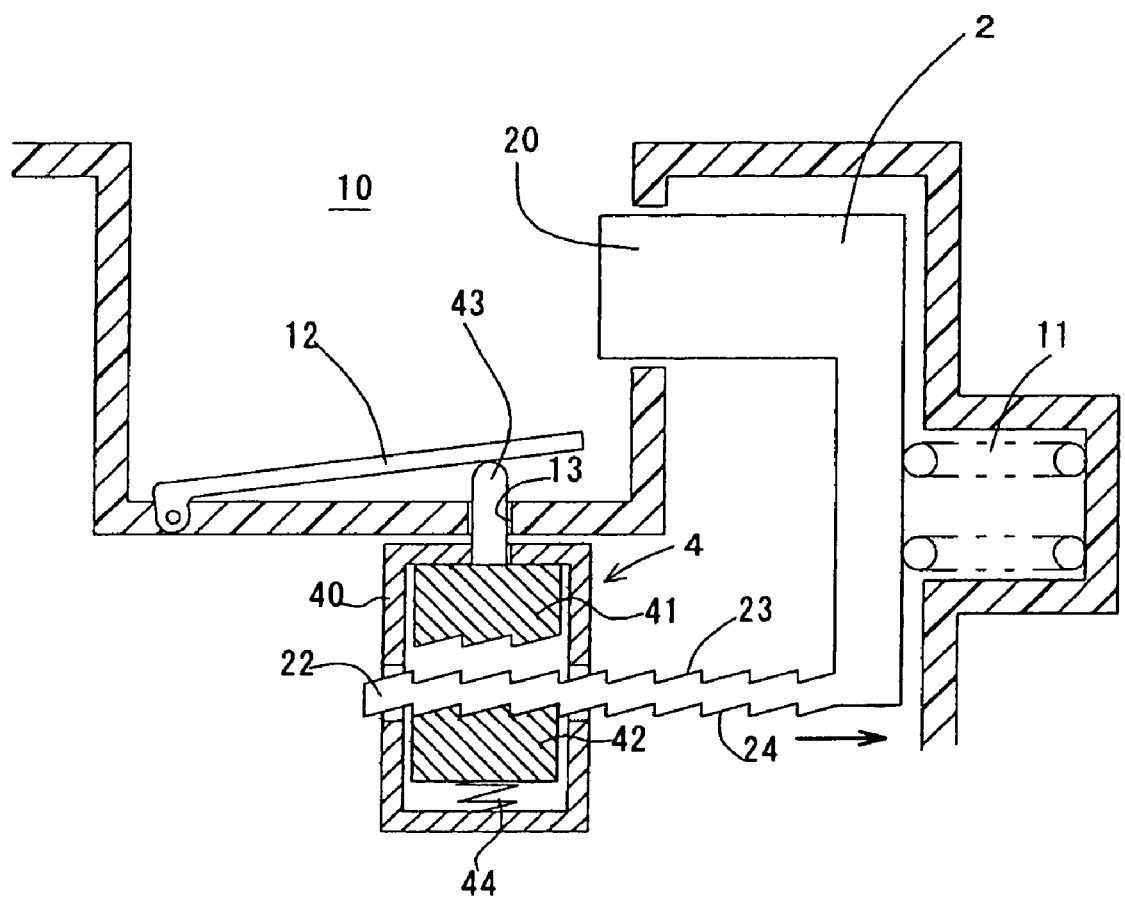
FIG. 6 is a cross-sectional diagram for illustrating a major portion of a cup holder according to Example No. 3 of the present invention.
Figure 7:
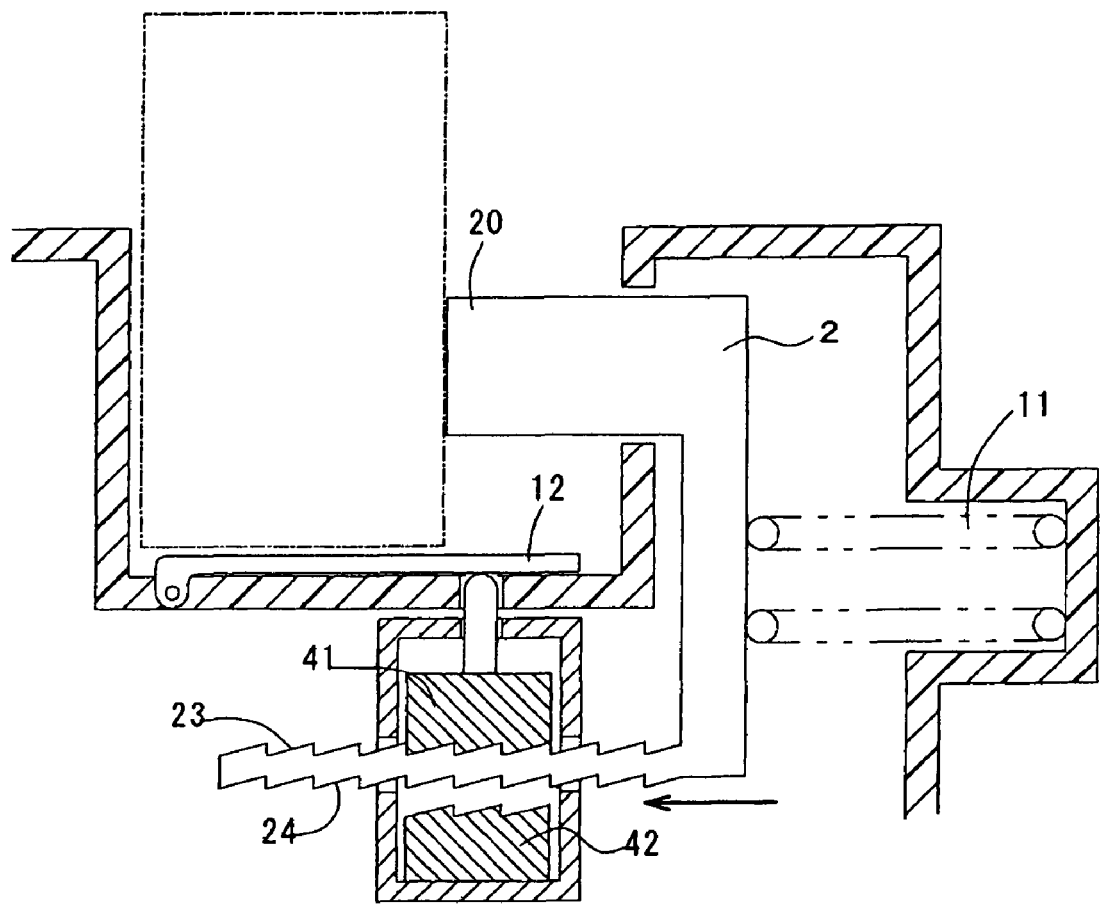
FIG. 7 is another cross-sectional diagram for illustrating the major portion of the cup holder according to Example No. 3.

FIGS. 6 and 7 illustrate a cup holder according to Example No. 3 of the present invention. Except that the cup holder according to Example No. 3 comprises: a mechanical unit 4, instead of the gear assembly 3 and spring 14; and a ratchet 22, instead of the supporting arm 2's rack 21, it comprises the same constituent elements as those of the cup holder according to Example No. 1. The constituent elements which are configured differently will be hereinafter described in detail.

The mechanical unit 4 comprises a framed body 40, an upper gear 41, a lower gear 42, a vertical shaft 43, and a spring 44. The framed body 40 is fastened to the box-shaped body 1. The upper gear 41 and lower gear 42 are disposed movably in the up/down direction within the framed body 40. The vertical shaft 43 is fastened to the upper gear 41 and lower gear 42, and is extended upward to penetrate the framed body 40. The spring 44 urges the upper gear 41 and lower gear 42 upward. The vertical shaft 43 is configured so that it can come in and come out of the box-shaped body 1's holder opening 10.

In addition, the supporting arm 2's ratchet 22 is configured so that it can come in and come out of the framed body 40. The ratchet 22 moves between the upper gear 41 and the lower gear 42. The ratchet 22 is provided with an upper ratchet 23 on the upper surface, and is provided with a lower ratchet 24 on the lower surface. The upper ratchet 23 meshes with the upper gear 41. The lower ratchet 24 meshes with the mechanical unit 4's lower gear 42. When the upper ratchet 23 meshes with the mechanical unit 4's upper gear 41, the ratchet 22 inhibits the supporting arm 2 from moving in the reverse direction. On the other hand, when the lower ratchet 24 meshes with the lower gear 42, the ratchet 22 inhibits the supporting arm 2 from moving in the forward direction.

Under the conditions shown in FIG. 6, that is, when no container is fitted into the cup holder according to Example No. 3 of the present invention through the holder opening 10 of the box-shaped body 1, the spring 44 urges the mechanical unit 4's lower gear 42 to engage it with the ratchet 22's lower ratchet 24. Moreover, the upper end of the vertical shaft 43 protrudes into the holder opening 10 through the through hole 13. Accordingly, the vertical shaft 43 presses the movable bottom plate 12 to swing it upward at one of the opposite ends. Under the circumstances, the supporting arm 2 is moved most rightward in the drawing, and the spring 11 accumulates an urging force therein. Consequently, since the mechanical unit 4's lower gear 42 meshes with the ratchet 22's lower ratchet 24, the supporting arm 2 is stopped to keep the conditions shown in FIG. 6.

When a user fits a container into the cup holder according to Example No. 3 of the present invention through the holder opening 10 of the box-shaped body 1, the weight of the container swings the lifted opposite end of the movable bottom plate 12 downward, and then presses the mechanical unit 4's vertical shaft 43 downward. Thus, the supporting arm 2's upper ratchet 23 meshes with the mechanical unit 4's upper gear 41. Then, the urging force of the spring 11 moves the supporting arm 2 in the forward direction. When the container is held between an inner wall surface of the holder opening 10 and an end surface of the supporting arm 2's arm 20, the supporting arm 2 stops moving leftward in the drawings. FIG. 7 illustrates these circumstances.

When the user takes the container out of the cup holder according to Example No. 3 of the present invention through the holder opening 10 of the box-shaped body 1, the spring 44 urges the mechanical unit 4's lower gear 42 upward to mesh the mechanical unit 4's lower gear 42 with the supporting arm 2's lower ratchet 24, and then the movable bottom plate 12 swings upward. Thus, the supporting arm 2 is inhibited from moving in such a direction that it advances to come inward into the holder opening 10. Consequently, the supporting arm 2 is stopped to keep the circumstances shown in FIG. 6. Therefore, it is possible for the user to fit the container or another container into the cup holder according to Example No. 3 through the holder opening 10 again.

Note that, under the conditions shown in FIG. 6, that is, when the mechanical unit 4's lower gear 42 meshes with the supporting arm 2's lower ratchet 24, the supporting arm 2 can move in the reverse direction. Therefore, when a user presses the supporting arm 2's arm 20 with his or her fingertip against the urging force of the spring 11, the supporting arm 2 moves readily in the reverse direction. As a result, the arm 20 retreats to come outward out of the box-shaped body 1's holder opening 10.

Example No. 4

Figure 8:
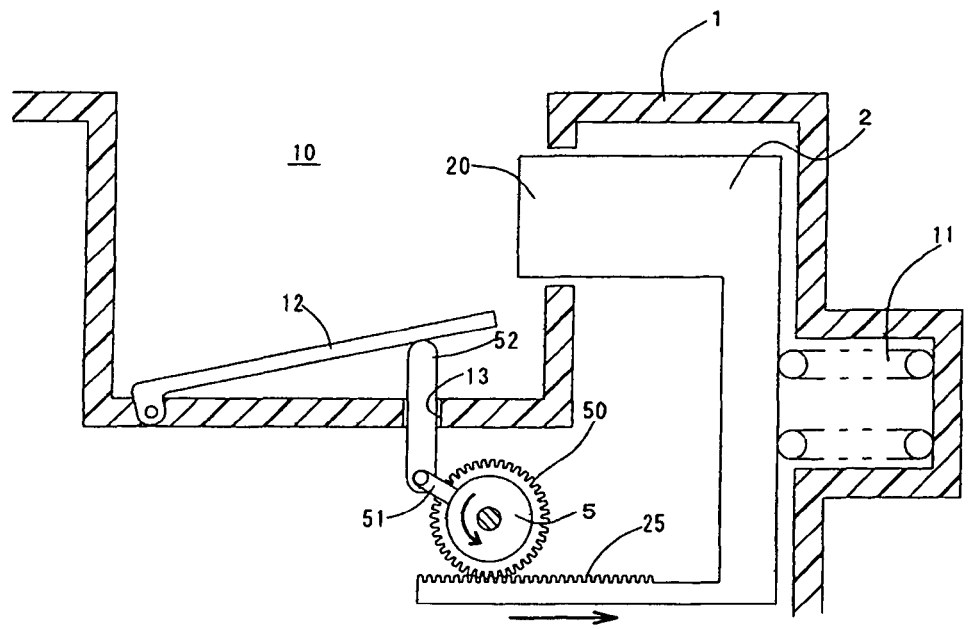
FIG. 8 is a cross-sectional diagram for illustrating a major portion of a cup holder according to Example No. 4 of the present invention.
Figure 9:
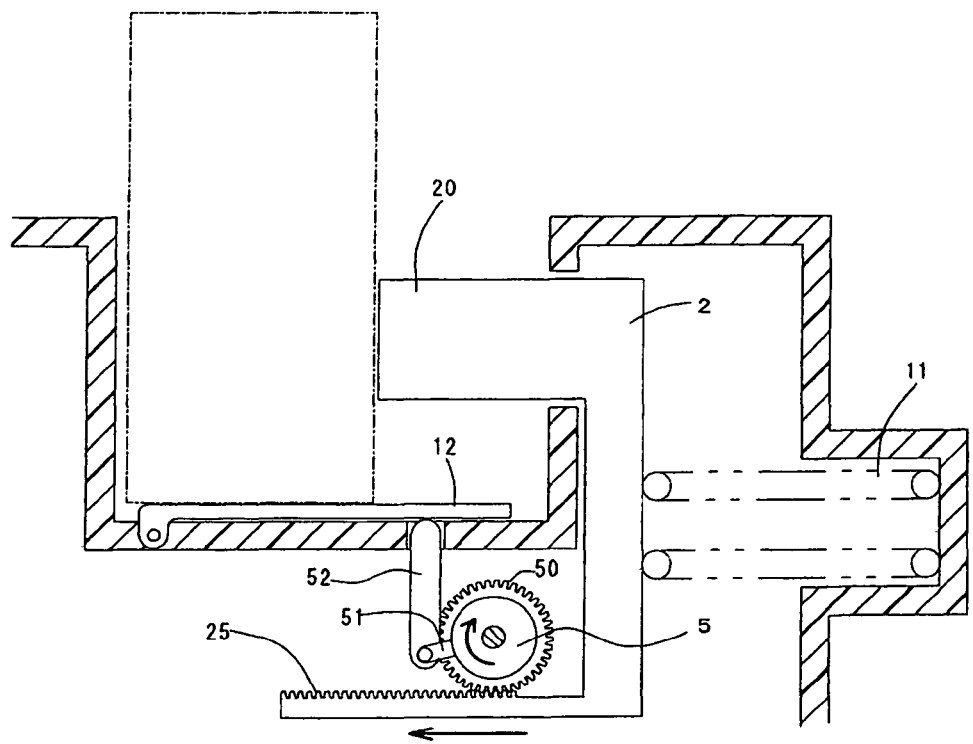
FIG. 9 is another cross-sectional diagram for illustrating the major portion of the cup holder according to Example No. 4.

FIGS. 8 and 9 illustrate a cup holder according to Example No. 4 of the present invention. Except that the cup holder according to Example No. 4 comprises a two-way clutch 5 instead of the gear assembly 3 and spring 14, it comprises the same constituent elements as those of the cup holder according to Example No. 1. The constituent element which is configured differently will be hereinafter described in detail.

The two-way clutch 5 comprises a rotary shaft, and a pinion gear 50. The pinion gear 50 is fastened to the rotary shaft, and meshes with the rack 25, which is extended from the supporting arm 2. Moreover, the two-way clutch 5 further comprises a lever 51. The lever 51 is protruded radially from the pinion gear 50, and is disposed for changing the rotary direction of the two-way clutch 5. Specifically, when the lever 51 is placed at an upward position shown in FIG. 8, the pinion gear 50 can rotate in the counterclockwise direction in the drawing. On the other hand, when the lever 51 is placed at a downward position shown in FIG. 9, the pinion gear 50 can rotate in the clockwise direction in the drawing.

Moreover, the two-way clutch 5 further comprises a not-shown spring, which is disposed therein. The not-shown spring urges the lever 51 to always place the lever 51 at the upward position. The lever 51 is provided with a vertical shaft 52 at the leading end. The vertical shaft 52 is supported pivotally to the leading end of the lever 51 so that the vertical shaft 52 can come in and come out of the box-shaped body 1's holder opening 10 through the through hole 13.

Under the conditions shown in FIG. 8, that is, when the cup holder according to Example No. 4 of the present invention does not hold any container, which is fitted through the box-shaped body 1's holder opening 10, therein, the not-shown spring urges the two-way clutch 5's lever 51 to place the lever 51 at the upward position shown in FIG. 8. Then, the vertical shaft 52's top or free end protrudes into the holder opening 10 through the through hole 13. Accordingly, the two-way clutch 5's vertical shaft 52 presses the movable bottom plate 12 upward. Consequently, the movable bottom plate 12 is swung upward at one of the opposite ends. Under the circumstances, the supporting arm 2 is moved most rightward in FIG. 8, and the spring 11 accumulates an urging force therein. Moreover, since the two-way clutch 5's pinion gear 50, which can rotate only in the counterclockwise direction in FIG. 8, meshes with the supporting arm 2's rack 25, the supporting arm 2 is stopped to keep the conditions shown in the drawing.

When fitting a container into the cup holder according to Example No. 4 of the present invention through the box-shaped body 1's holder opening 10, the weight of the container swings the lifted opposite end of the movable bottom plate 12 downward, and then presses the two-way clutch 5's vertical shaft 52 downward. Thus, the two-way clutch 5's lever 51 is pressed down to the downward position shown in FIG. 9. Then, it is possible for the two-way clutch 5's pinion gear 50 to rotate only in the clockwise direction in FIG. 9. As a result, the urging force of the spring 11 moves the supporting arm 2 in the forward direction to eventually put the supporting arm 2 in the state shown in FIG. 9.

When taking the container out of the cup holder according to Example No. 4 of the present invention through the box-shaped body 1's holder opening 10, the not-shown spring urges the two-way clutch 5's lever 51 to place the lever 51 at the upward position as shown in FIG. 8. Accordingly, the movable bottom plate 12 swings upward. Consequently, the supporting arm 2 is inhibited from moving in such a direction that it advances to come inward into the holder opening 10. All in all, the supporting arm 2 is stopped to keep the circumstances shown in FIG. 8. Therefore, the cup holder according to Example No. 4 makes it possible to fit the container or another container thereinto through the holder opening 10 again.

Moreover, under the conditions shown in FIG. 8 in which the two-way clutch 5's lever 51 is placed at the upward position, it is possible for the two-way clutch 5's pinion gear 50 to rotate in the counterclockwise direction in the drawing. Therefore, by simply pressing the supporting arm 2's arm 20 with a user's fingertip against the urging force of the spring 11, it is possible to readily move the supporting arm 2 in the reverse direction. Accordingly, the arm 20 retreats to come outward out of the box-shaped body 1's holder opening 10. Consequently, the cup holder according to Example No. 4 of the present invention is put back in the state shown in FIG. 8 from the state shown in FIG. 9.

Note that the cup holder according to Example No. 3 of the present invention might produce abnormal noises when operating, because it utilizes the ratchet mechanism. However, the cup holder according to Example No. 4 or the cup holders according to Example Nos. 1 and 2 can inhibit such abnormal noises from arising.

Example No. 5

Figure 10:
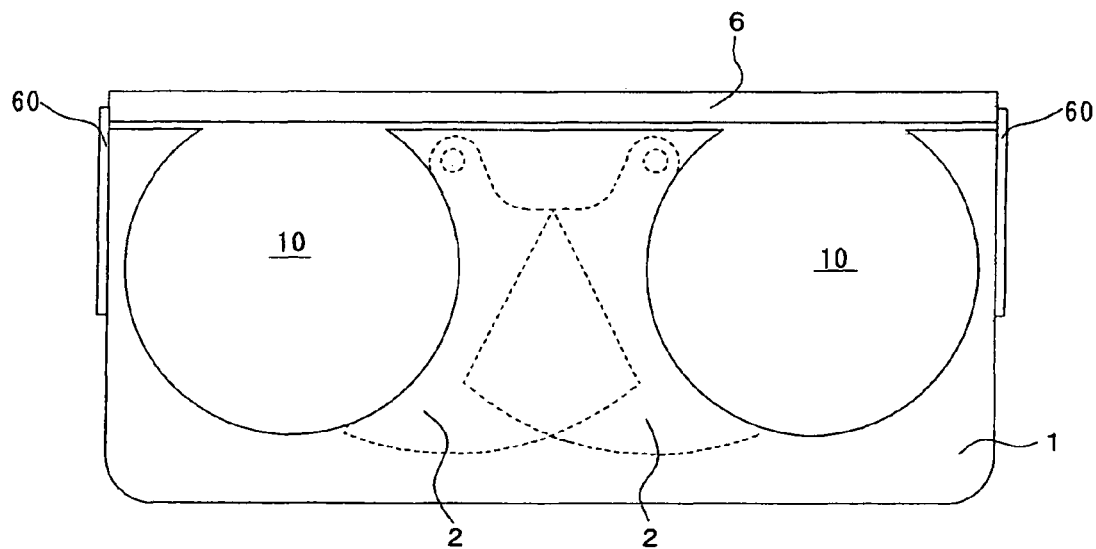
FIG. 10 is a plan view for illustrating a cup holder according to Example No. 5 of the present invention.
Figure 11:
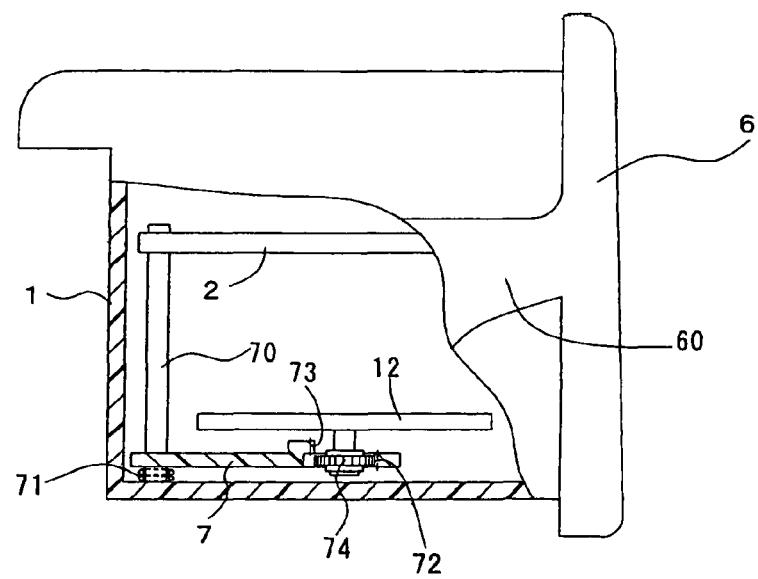
FIG. 11 is a cross-sectional diagram for illustrating a major portion of the cup holder according to Example No. 5.
Figure 12:
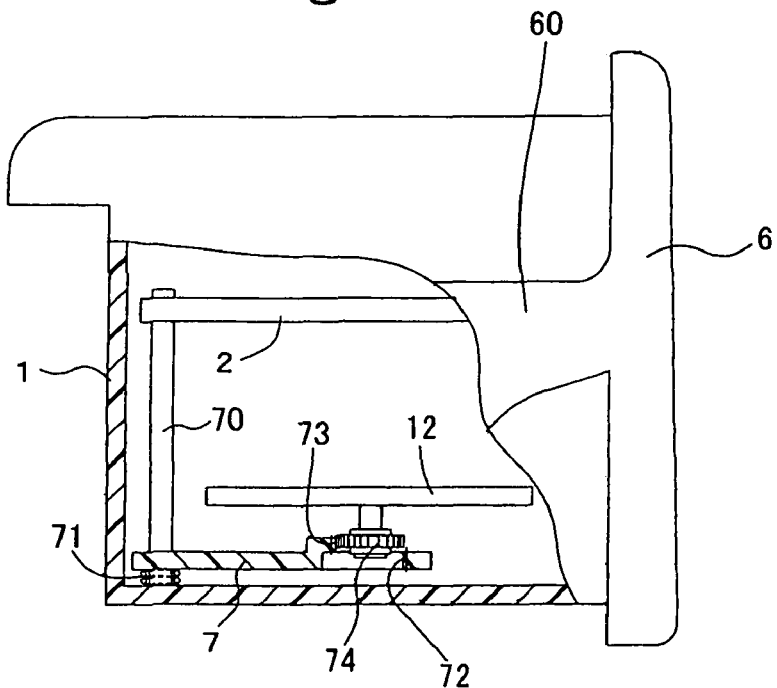
FIG. 12 is another cross-sectional diagram for illustrating the major portion of the cup holder according to Example No. 5.

FIGS. 10 through 14 illustrate a cup holder according to Example No. 5 of the present invention. The cup holder according to Example No. 5 comprises a box-shaped body 1, a lid 6, and paired supporting arms 2, 2. The box-shaped body 1 has paired holder openings 10, 10 at a top thereof. The lid 6 opens and closes the paired holder openings 10, 10 of the box-shaped body 1. The paired supporting arms 2, 2 are retained swingably to the box-shaped body 1 so that they can come in and come out of the paired holder openings 10, 10. Moreover, the lid 6 is retained swingably to the body 1 by way of a bracket 60 as shown in FIGS. 10 through 12.

Hereinafter, descriptions on constituent elements, which possess the same functions as those constituent elements of the cup holders according to Example Nos. 1 through 4 of the present invention will be simplified, but those constituent elements, which function differently therefrom, will be described in detail.

Figure 13:
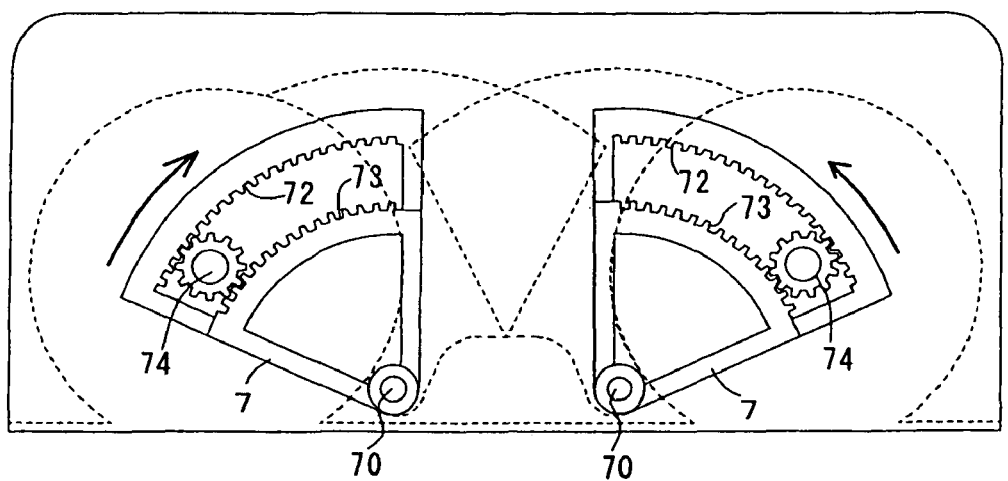
FIG. 13 is a plan view for illustrating the inside of the cup holder according to Example No. 5.
Figure 14:
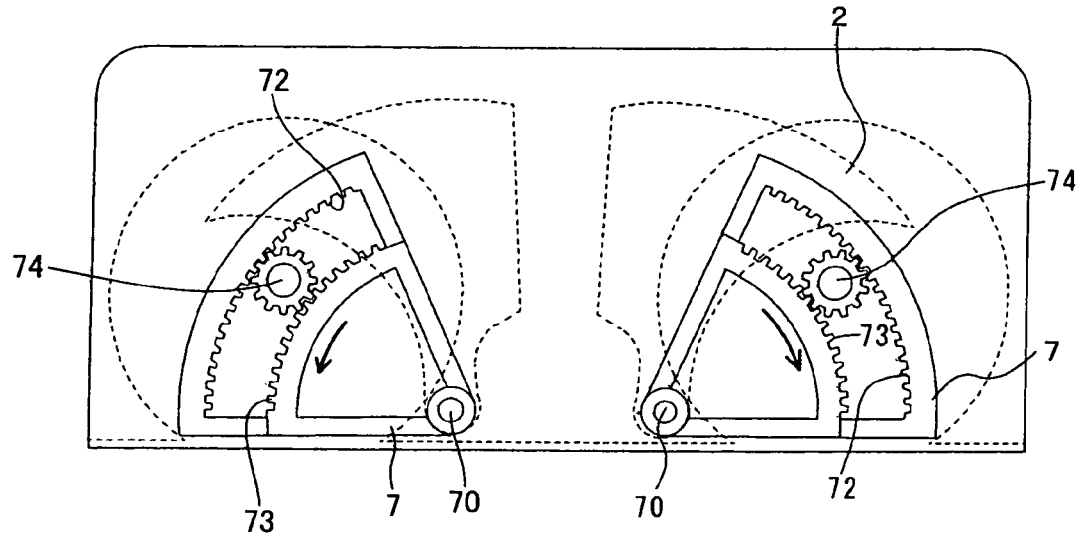
FIG. 14 is another plan view for illustrating the inside of the cup holder according to Example No. 5.

As illustrated in FIGS. 13 and 14, the cup holder according to Example No. 5 of the present invention further comprises paired sector-shaped racks 7, 7, and paired pillars 70, 70. Specifically, the respective pillars 70, 70 are extended upward from the bottom of the box-shaped body 1, and are retained rotatably to the bottom to make rotary shafts for rotatably supporting the respective racks 7, 7. The respective racks 7, 7 are fastened to the respective pillars 70, 70 at the respective centers. Thus, the respective racks 7, 7 are disposed rotatably to the bottom of the box-shaped body 1. Moreover, as illustrated in FIGS. 11 and 12, the respective supporting arms 2, 2 are fastened to the top or leading end of the respective pillars 70, 70. Accordingly, the respective racks 7, 7 and the respective supporting arms 2, 2 swing synchronously. In addition, a coil spring 71 is interposed between the bottom of the box-shaped body 1 and the respective pillars 70, 70. Consequently, the respective springs 71, 71 urge the respective supporting arms 2, 2 in such a forward direction that the respective supporting arms 2, 2 advance to come inward into the respective holder openings 10, 10 of the box-shaped body 1.

As illustrated in FIGS. 13 and 14, each of the racks 7, 7 is provided with an internal gear 72 and an external gear 73. The internal gear 72 and the external gear 73 face to each other. As illustrated in FIGS. 11 and 12, the internal gear 72 is formed at a part that corresponds to the end surface of the respective racks 7, 7. However, the external gear 73 is formed at a thickened part of the respective racks 7, 7. That is, the internal gear 72 and external gear 73 are disposed at offset positions, which are set apart from each other in the axial direction of the respective pillars 70, 70.

Moreover, as illustrated in FIGS. 11 and 12, the cup holder according to Example No. 5 of the present invention further comprises paired movable bottom plates 12, 12. Each movable bottom plate 12 retains a pinion gear 74. The pinion gear 74 is configured as a one-way clutch mechanism, and can rotate only in one direction. As each movable plate 12 moves in the up/down direction, the pinion gear 74 moves in the up/down direction as well. Specifically, as illustrated in FIGS. 13 and 14, the pinion gear 74 is disposed between the internal gear 72 and the external gear 73. When the movable bottom plate 12 fully descends, the movable bottom plate 12's pinion gear 74 meshes with the rack 7's internal gear 72 as shown in FIG. 11. On the other hand, when the movable bottom plate 12 fully ascends, the movable bottom plate 12's pinion gear 74 meshes with the rack 7's external gear 73 as shown in FIG. 12.

When fitting a container into the cup holder according to Example No. 5 of the present invention through one of the holder openings 10, 10 of the box-shaped body 1, the weight of the container moves the movable bottom plate 12 downward, and then the movable bottom plate 12's pinion gear 74 meshes with the rack 7's internal gear 72 as shown in FIG. 11. Accordingly, the urging force of the spring 71 swings the rack 7 unidirectionally: for example, the urging force of the right-hand side spring 71 swings the right-hand side rack 7 in the clockwise direction; and the urging force of the left-hand side spring 71 swings the left-hand side rack 7 in the counterclockwise direction; as shown in FIG. 14. Consequently, the respective supporting arms 2, 2 swing in such a direction that they advance to come inward into the box-shaped body 1's holder openings 10, 10, and then contact with the container. Thus, the cup holder according to Example No. 5 can stably hold the container.

On the other hand, when taking the container out of the cup holder according to Example No. 5 of the present invention through one of the holder openings 10, 10 of the box-shaped body 1, a not-shown spring urges the movable bottom plate 12 to ascend, and then the movable bottom plate 12's pinion gear 74 meshes with the rack 7's external gear 73 as shown in FIG. 12. Accordingly, the direction of the swinging rack 7, which is urged by the coil spring 71, is made opposite to the direction of the rotating pinion gear 74. That is, although the right-hand side rack 7 tries to swing in the counterclockwise direction as shown in FIG. 13, the right-side pinion gear 74 rotates in the clockwise direction, for instance. Similarly, although the left-hand side rack 7 tries to swing in the clockwise direction as shown in FIG. 13, the left-side pinion gear 74 rotates in the counterclockwise direction, for instance. Consequently, both racks 7, 7 do not swing at all. Thus, both racks 7, 7 are put in a halt condition.

Under the above-described conditions, when fitting a small-diameter container whose diameter is smaller than that of the prior container into the cup holder according to Example No. 5 of the present invention through one of holder openings 10, 10 of the body 1, the movable bottom plate 12 descends, and then the movable bottom plate 12's pinion gear 74 meshes with the rack 7's internal gear 72 as shown in FIG. 11. Accordingly, the urging force of the spring 71 swings the rack 7 unidirectionally: for example, the urging force of the right-hand side spring 71 swings the right-hand side rack 7 in the clockwise direction; and the urging force of the left-hand side spring 71 swings the left-hand side rack 7 in the counterclockwise direction; as shown in FIG. 14. Consequently, the respective supporting arms 2, 2 swing furthermore in such a direction that they advance to come inward into the box-shaped body 1's holder openings 10, 10, and then contact with the container with a smaller diameter. Thus, the cup holder according to Example No. 5 can stably hold the smaller-diameter container as well.

Note that, under the circumstances shown in FIG. 12 in which both racks 7, 7 are put in a halt condition, it is possible for both racks 7,7 to swing in the opposite directions to the rotating directions of both pinion gears 74, 74. That is, it is possible for both racks 7, 7 to swing in such a direction that they retreat to come outward out of the holder openings 10, 10 of the box-shaped body 1, respectively. Specifically, the right-side pinion gear 74 rotates in the clockwise direction to swing the right-hand side rack 7 in the counterclockwise direction as shown in FIG. 13, for instance. Similarly, the left-side pinion gear 74 rotates in the counterclockwise direction to swing the left-hand side rack 7 in the clockwise direction as shown in FIG. 13, for instance. Therefore, by simply pressing one of the paired supporting arms 2, 2 with a user's fingertip against the urging force of one of the paired springs 71, 71, it is possible for the user to readily retreat the one of the paired supporting arms 2, 2 to come outward out of one of the holder openings 10, 10.

Example No. 6

Figure 15:
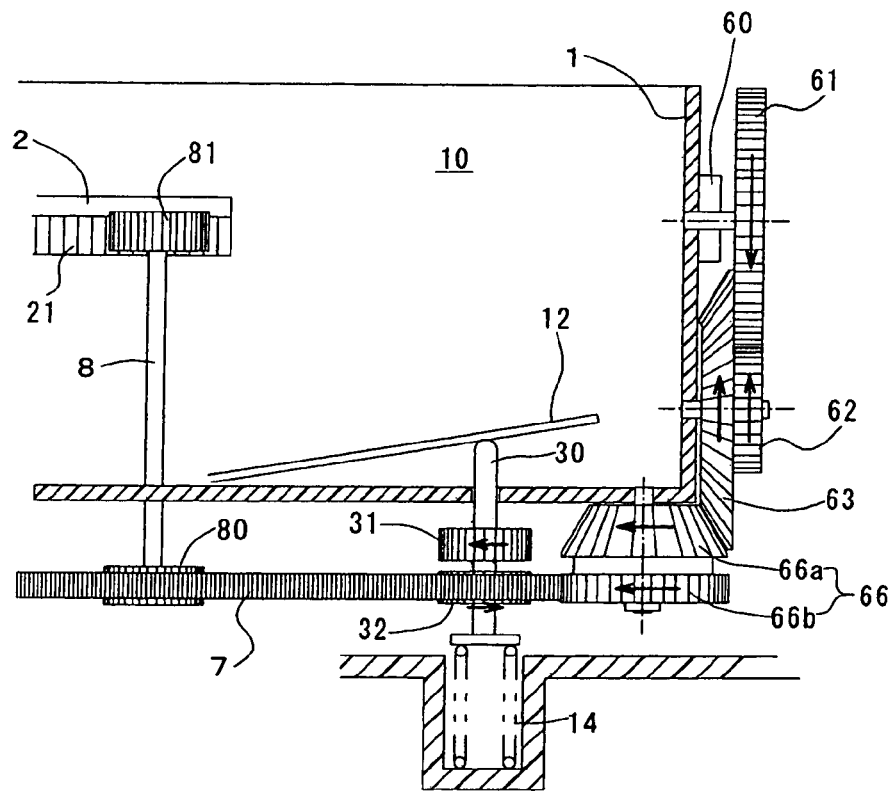
FIG. 15 is a cross-sectional diagram for illustrating a major portion of a cup holder according to Example No. 6 of the present invention.
Figure 17:
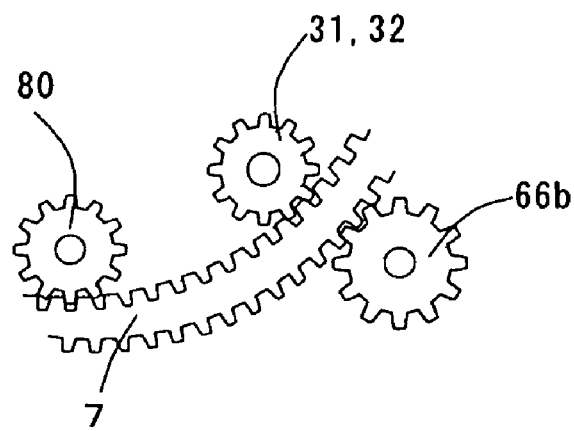
FIG. 17 is a plan view for illustrating a major portion of the cup holder according to Example No. 6.
Figure 18:
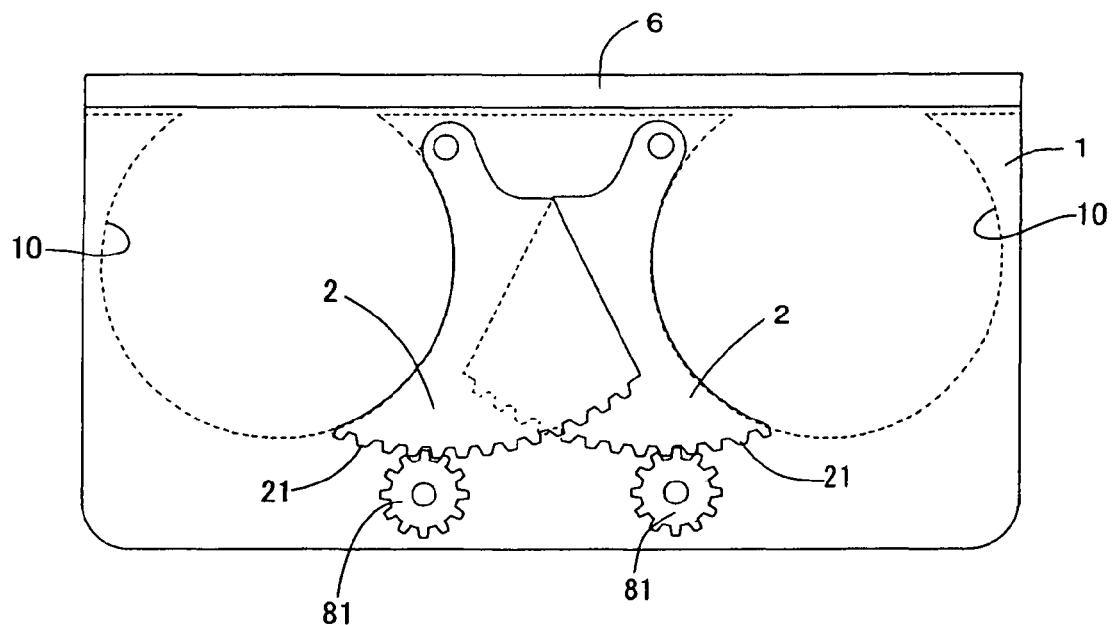
FIG. 18 is a plan view for illustrating the inside of the cup holder according to Example No. 6.
Figure 19:
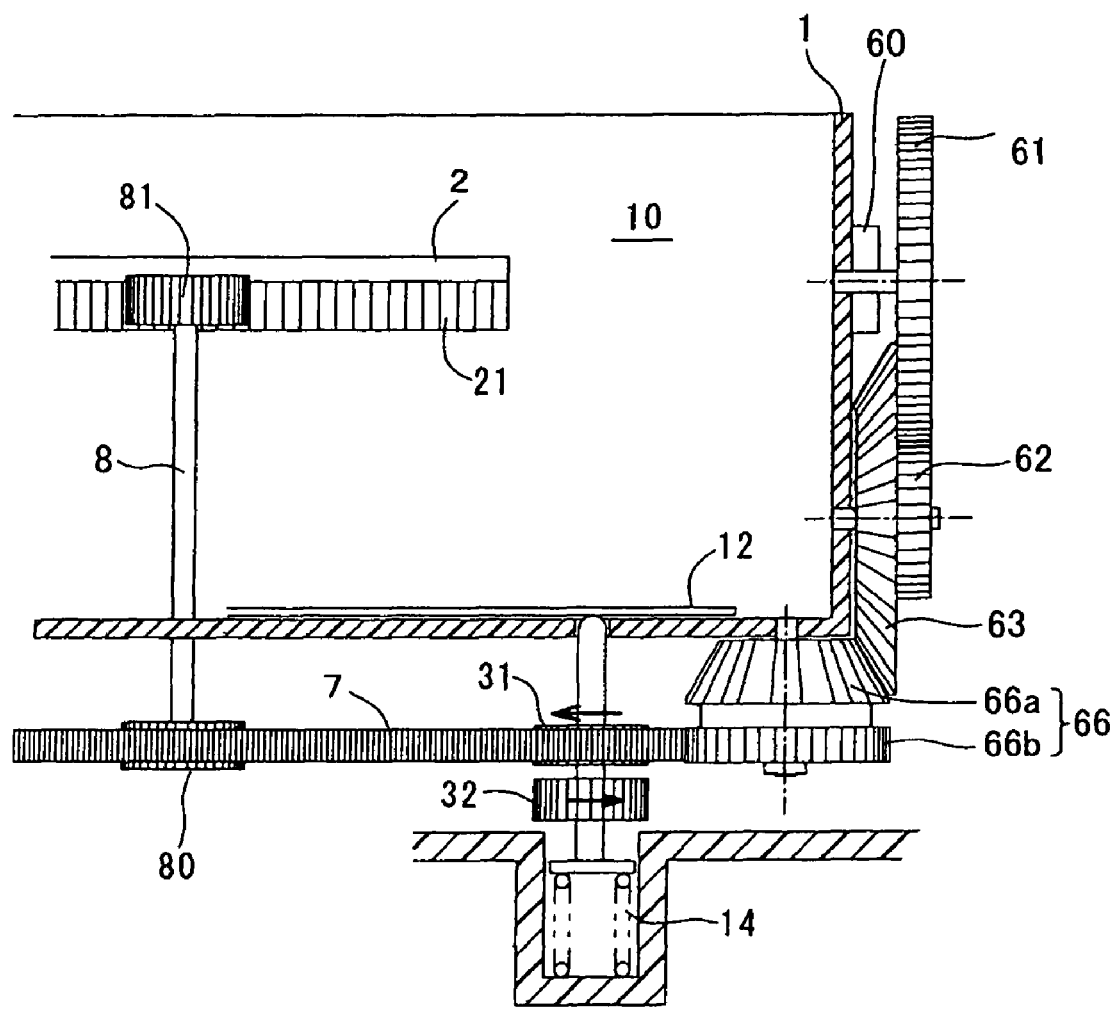
FIG. 19 is another cross-sectional diagram for illustrating the major portion of the cup holder according to Example No. 6.

FIGS. 15 through 19 illustrate a cup holder according to Example No. 6 of the present invention. The cup holder according to Example No. 6 comprises a box-shaped body 1, a lid 6 (see FIG. 18), and paired supporting arms 2, 2 (see FIG. 18). The box-shaped body 1 has paired holder openings 10, 10 at a top thereof. The lid 6, which is configured similarly to that of the cup holder according to Example No. 5, opens and closes the paired holder openings 10, 10 of the box-shaped body 1. The paired supporting arms 2, 2 are retained swingably to the box-shaped body 1 so that they can come in and come out of the paired holder openings 10, 10. Moreover, the lid 6 is retained swingably to the box-shaped body 1 by way of a bracket 60 as shown in FIGS. 15 and 19.

Hereinafter, descriptions on constituent elements, which possess the same functions as those constituent elements of the cup holders according to Example Nos. 1 through 5 of the present invention will be simplified, but those constituent elements, which function differently therefrom, will be described in detail. Note that the holder opening 10 of the box-shaped body 1 and the supporting arm 2 are disposed in a quantity of two, respectively, which are paired symmetrically in the right/left direction. Moreover, the cup holder according to Example No. 6 of the present invention further comprises paired gear mechanisms, which will be hereinafter described in detail. The paired gear mechanisms are likewise disposed symmetrically in the right/left direction. However, the drawings used for the descriptions below might illustrate one of those, which are disposed on one of the right and left sides of the cup holder according to Example No. 6.

As illustrated in FIG. 15, the lid 6 comprises the bracket 60, and a first gear 61, which is fastened to the bracket 60. The first gear 61 rotates as the lid 6 swings. Note that the bracket 60 has a not-shown built-in spring. The not-shown built-in spring accumulates an urging force when the lid 6 closes the box-shaped body 1's holder openings 10, 10, and urges the lid 6 to open the holder openings 10, 10 by the accumulated urging force.

Figure 16:
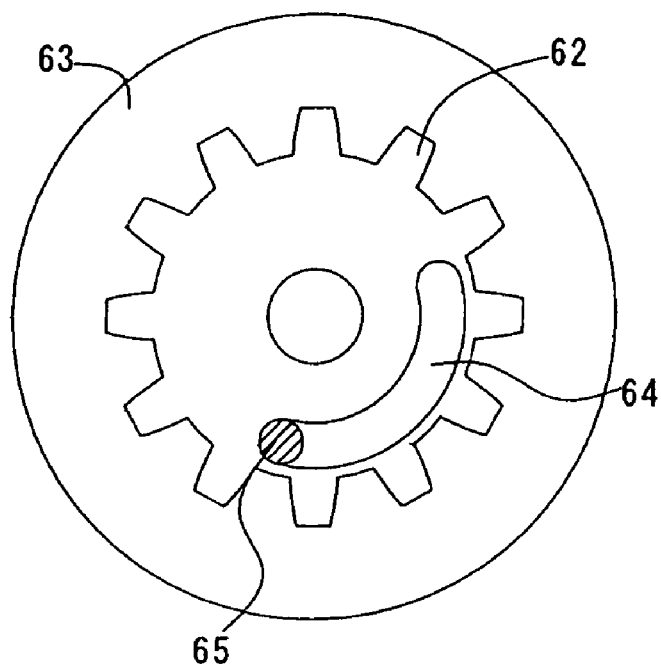
FIG. 16 is a plan view for illustrating a gear assembly, which is used for the cup holder according to Example No. 6.

As illustrated in FIG. 15, the box-shaped body 1 further comprises a second gear 62, and a bevel gear 63. The second gear 62 meshes with the first gear 61. The bevel gear 63 is retained rotatably to the central shaft of the second gear 62. As illustrated in FIG. 16, the second gear 62 is provided with an arc-shaped slot 64, which penetrates the second gear 62. Moreover, a boss 65 protrudes from a surface of the bevel gear 63 so as to engage with the arc-shaped slot 64. Therefore, while the boss 65 moves within the arc-shaped slot 64, the second gear 62 and the bevel gear 63 can rotate independently to each other. On the contrary, when the boss 65 engages with the opposite ends of the arc-shaped slot 64, the second gear 62 and the bevel gear 63 rotate as an integral piece.

Moreover, as illustrated in FIG. 15, the box-shaped body 1 further comprises a third gear 66, which is disposed rotatably onto the rear-surface side of the box-shaped body 1's bottom wall. The third gear 66 is made of a bevel gear 66a and a spur gear 66b. The third gear 66's bevel gear 66a meshes with the bevel gear 63.

Under the box-shaped body 1's holder opening 10, there are disposed an upper pinion gear 31 and a lower pinion gear 32, which are configured in the same manner as Example No. 1. The spring 14 urges the top or leading end of a vertical shaft 30 in such a direction that the vertical shaft 30 advances so as to come inward into the holder opening 10.

As illustrated in FIG. 17, an arc-shaped rack 7 interposes between the upper pinion gear 31 or lower pinion gear 32 and the third gear 66's spur gear 66b. The rack 7 is provided with rack teeth on the internal and external surfaces. Accordingly, the rack 7 meshes with both upper pinion gear 31 (or lower pinion gear 32) and spur gear 66b as shown in the drawing. Moreover, as illustrated in FIGS. 15 and 19, a pillar 8 penetrates through the box-shaped body 1's bottom wall. The pillar 8 is provided with a fourth gear 80 and a fifth gear 81, which are fastened to the opposite ends. A not-shown coil spring is disposed between the pillar 8 and the box-shaped body 1. The not-shown coil spring urges the fourth gear 80 and fifth gear 81 so as to rotate unidirectionally. Note that the fourth gear 80 meshes with the rack 7.

As illustrated in FIG. 18, the paired arc-shaped supporting arms 2, 2 are supported swingably to the box-shaped body 1 about a shaft, respectively. The paired arc-shaped supporting arms 2, 2 are provided with rack teeth 21, respectively. The respective rack teeth 21, 21 mesh with the respective fifth gears 81, 81.

In the cup holder according to Example No. 6 of the present invention, the not-shown coil spring is wound up when closing the lid 6. Accordingly, the not-shown coil spring accumulates an urging force for rotating the fourth gear 80 and fifth gear 81 unidirectionally. Specifically, the movement of the closing lid 6 rotates the first gear 61 in the arrowheaded direction as designated in FIG. 15, and thereby the second gear 62 rotates in the direction opposite to the first gear 61's rotating direction as designated in the drawing. Then, as shown in FIG. 16, the bevel gear 63's boss 65 engages with one of the opposite ends of the second gear 62's arc-shaped slot 64, and thereby the bevel gear 63 rotates in the same direction as the second gear 62's rotating direction as designated in FIG. 15. Moreover, the thus rotating bevel gear 63 rotates the third gear 66's bevel gear 66a and spur gear 66b in the arrowheaded direction as designated in FIG. 15, that is, in the clockwise direction in FIG. 17. In addition, since the third gear 66's spur gear 66b meshes with the rack 7's rack teeth, the rack 7 tries to move rightward in FIG. 15.

In this instance, since the box-shaped body 1's holder opening 10 is empty, the rack 7 meshes with the lower pinion gear 32 as shown in FIG. 15. Note that the lower pinion gear 32 can rotate only in the counterclockwise direction in FIG. 17. Accordingly, the rack 7 is not inhibited from moving at all, and rotates in the counterclockwise direction in FIG. 17. As the rack 7 rotates in the counterclockwise direction in FIG. 17, the right-hand-side fourth gear 80 and fifth gear 81 rotate in the counterclockwise direction in FIG. 18. Consequently, the right-hand-side supporting arm 2 retreats to come outward out of the holder opening 10, and thereby the not-shown coil spring accumulates an urging force for urging the supporting arm 2 therein.

When opening the lid 6 to make use of the cup holder according to Example No. 6 of the present invention, it is necessary to rotate the respective gears in the opposite directions to the above-described directions, that is, in the opposite directions to the directions shown in FIG. 15. Note, however, that, since the rack 7 meshes with the lower pinion gear 32 as shown in FIG. 17, the lower pinion gear 32 cannot rotate in the opposite direction to the arrowheaded direction shown in FIG. 15, that is, in the leftward direction in the drawing or in the clockwise direction in FIG. 17.

However, the urging force of the not-shown built-in spring, which is incorporated into the bracket 60, is transmitted to the second gear 62 by way of the first gear 61. On this occasion, since the bevel gear 63's boss 65 is placed at one of the opposite ends of the second gear 62's arc-shaped slot 64, that is, at the other one of the opposite ends thereof being disposed oppositely to the hatched opposite end shown in FIG. 16, the second gear 62 can rotate in the counterclockwise direction in FIG. 16 by an arc length that the boss 65 moves within the arc-shaped slot 64 from one of the opposite ends to the other one thereof. As a result, it is possible to open the lid 6 while keeping the bevel gear 63 being put in a halt condition. When the lid 6 is opened, the boss 65 is placed at the hatched opposite end of the arc-shaped slot 64 shown in FIG. 16, which views the frontal faces of the second gear 62 and bevel gear 63.

When fitting a container into the cup holder according to Example No. 6 of the present invention through the box-shaped body 1's holder opening 10, the weight of the container swings the movable bottom plate 12 downward, and then the upper pinion gear 31 meshes with the rack 7 as shown in FIG. 19. Note that the upper pinion gear 31 can rotate only in the clockwise direction in FIG. 17. Accordingly, the rack 7 can move leftward alone in FIG. 19. Consequently, the urging force of the not-shown coil spring tries to rotate the right-hand-side fourth gear 80 and fifth gear 81 in the clockwise direction in FIG. 18, and then the rack 7 tries to move leftward in FIG. 19.

However, it seems that the rack 7 is inhibited from moving leftward in FIG. 19, because the respective gears, the first gear 61, second gear 62, bevel gear 63 and third gear 66, interpose between the lid 6 and the rack 7. On the contrary, in the cup holder according to Example No. 6 of the present invention, the second gear 62 is provided with the arc-shaped slot 64. Moreover, the bevel gear 63 is provided with the boss 65. In addition, the boss 65 is placed at the one of the opposite ends of the arc-shaped slot 64 to penetrate through the second gear 62 as designated with the hatching shown in FIG. 16. Accordingly, the bevel gear 63 can rotate by such an arc distance that the boss 65 moves from the hatched opposite end of the slot 64 to the other opposite end thereof in the counterclockwise direction in FIG. 16. Consequently, the bevel gear 63 can rotate idly in the counterclockwise direction in FIG. 16.

Thus, the accumulated urging force of the not-shown coil spring can rotate the fourth gear 80 and fifth gear 81 in the clockwise direction in FIG. 17. Therefore, the supporting arms 2, 2 swing in such a direction that they advance to come inward into the box-shaped body 1' holder openings 10, 10; that is, the right-hand-side supporting arm 2 swings in the counterclockwise direction in FIG. 18, for instance, to eventually contact with the container. All in all, the cup holder according to Example No. 6 of the present invention can stably hold the container therein. In this instance, note that the bevel gear 63's boss 65 is placed at the other one of the opposite ends of the second gear 62's arc-shaped slot 64; that is, at the blank opposite end thereof that is disposed oppositely in the counterclockwise direction with respect to the hatched opposite end shown in FIG. 16.

On the other hand, when taking the container out of the cup holder according to Example No. 6 of the present invention through the box-shaped body 1's holder opening 10, the spring 14 urges the movable bottom plate 12 to ascend, and then the lower pinion gear 32 meshes with the rack 7 as shown in FIG. 15. Accordingly, the direction of the moving rack 7, which is urged by the not-shown coil spring, is made opposite to the direction of the rotating lower pinion gear 32. That is, although the rack 7 tries to move leftward in FIG. 15, the lower pinion gear 32 can rotate only in the counterclockwise direction, that is, rightward in FIG. 15. Consequently, the lower pinion gear 32 cancels the leftward movement of the rack 7 in the drawing. Thus, the rack 7 is put in a halt condition.

Under the conditions shown in FIG. 15 in which the rack 7 is stopped, when trying to retreat the rack 7 to come outward out of the box-shaped body 1's holder opening 10 by pressing it with a finger, the fourth gear 80 and fifth gear 81 rotate in the counterclockwise direction in FIG. 17, and then the rack 7 tries to move rightward in FIG. 15. The direction of the rightwardly-moving rack 7 coincides with the direction of the rotating lower pinion gear 32, that is, in the counterclockwise direction in FIG. 17 (or rightward in FIG. 15). However, under the circumstances, it seems that the rack 7 is inhibited from moving rightward in FIG. 15, because the respective gears, the first gear 61, second gear 62, bevel gear 63 and third gear 66, interpose between the lid 6 and the rack 7. On the contrary, in the cup holder according to Example No. 6 of the present invention, the second gear 62 is provided with the arc-shaped slot 64. Moreover, the bevel gear 63 is provided with the boss 65. In addition, the boss 65 is placed at the other one of the opposite end of the slot 64, which is disposed oppositely in the counterclockwise direction with respect to the hatched opposite thereof shown in FIG. 16, to penetrate through the second gear 62. Accordingly, the bevel gear 63 can rotate by such an arc distance that the boss 65 moves from the other opposite end of the slot 64 to the hatched opposite end thereof in the clockwise direction in FIG. 16. Consequently, the bevel gear 63 can rotate idly in the clockwise direction in FIG. 16.

Therefore, when pressing the supporting arm 2 against the urging force of the not-shown coil spring, it is possible to readily retreat the supporting arm 2 to come outward out of the box-shaped body 1's holder opening 10.

Moreover, when closing the lid 6 upon finishing using the cup holder according to Example No. 6 of the present invention, the not-shown coil spring is wound up, and accumulates an urging force for rotating the fourth gear 80 and fifth gear 81 unidirectionally, as described above. Then, the right-hand-side fourth gear 80 and fifth gear 81 rotate in the counterclockwise direction in FIG. 18, and thereby the right-hand-side supporting arm 2 retreats to come outward out of the box-shaped body 1's holder opening 10. Accordingly, when reopening the lid 6 for the next round of operation, the supporting arm 2 has been already retreated out of the holder opening 10. Consequently, even a container with a larger diameter can be fitted into the cup holder according to Example No. 6 through the holder opening 10 with ease.

Having now fully described the present invention, it will be apparent to one of ordinary skill in the art that many changes and modifications can be made thereto without departing from the spirit or scope of the present invention as set forth herein including the appended claims.

What is claimed is:

1. A cup holder, comprising:
a box-shaped body having a holder opening at a top thereof;
a supporting arm retained to the box-shaped body, and disposed movably so as to come in and come out of the holder opening of the box-shaped body;
an urging element for urging the supporting arm in such a direction that the supporting arm advances to come inward into the holder opening of the box-shaped body;
an engaging element for temporarily engaging the supporting arm at a retreated position where the supporting arm retreats to come outward out of the holder opening of the box-shaped body;
an enabling/disabling element for enabling the urging action of the urging element and for disabling the engagement action of the engaging element, wherein the urging action of the engaging element is caused by a pressing force resulting from a container that is fitted into the box-shaped body through the holder opening;
a fixing element comprising a mechanical mechanism for fixing the supporting arm in such a state that the supporting arm is brought into contact with an outer peripheral surface of the container; and
a releasing element comprising a mechanical mechanism for releasing the supporting arm from the fixing action of the fixing element upon taking out the container through the holder opening of the box-shaped body and for enabling the supporting arm to move in such a direction that the supporting arm retreats to come outward out of the holder opening, wherein
a movable bottom plate is located at a bottom of the holder opening and is movable in an up/down direction, and
the enabling/disabling element acts only in response to a movement in the up/down direction of the movable bottom plate.

2. The cup holder according to claim 1, wherein the releasing element comprises:
a movable bottom disposed in the holder opening of the box-shaped body, and being urged upward; and
a link mechanism for releasing the supporting arm from the fixing action of the fixing element as the movable bottom moves upward, for inhibiting the supporting arm from moving in such a direction that the supporting arm advances to come inward into the holder opening of the box-shaped body and for enabling the supporting arm to move in such a direction that the supporting arm retreats to come outward out of the holder opening.

3. The cup holder according to claim 1 further comprising a lid for opening and closing the holder opening of the box-shaped body, wherein the urging element accumulates an urging force when the lid moves in such a direction that the lid closes the holder opening of the box-shaped body.

4. The cup holder according to claim 3 further comprising a compulsory releasing element for releasing the supporting arm from the fixing action of the fixing element when the lid moves in such a direction that the lid closes the holder opening of the box-shaped body, and for moving the supporting arm compulsorily in such a direction that the supporting arm retreats to come outward out of the holder opening.

5. The cup holder according to claim 2, wherein the link mechanism comprises a ratchet mechanism.

6. The cup holder according to claim 2, wherein the link mechanism comprises a one-way clutch gear.

7. The cup holder according to claim 2, wherein the link mechanism comprises a two-way clutch gear.

8. The cup holder according to claim 1, wherein the fixing element doubles as the engaging element.

9. The cup holder according to claim 1, wherein the engaging element doubles as the fixing element.

10. The cup holder according to claim 1, wherein the engaging element includes a pinion gear, the fixing element includes a rack, and the releasing element includes a one-way clutch, and the pinion gear, the rack and the one-way clutch mechanism act only in response to the movement in the up/down direction of the movable bottom plate.

* * * * *